(12) United States Patent
Condon et al.

(10) Patent No.: US 9,273,813 B2
(45) Date of Patent: Mar. 1, 2016

(54) IN-LINE WATER HAMMER ARRESTER

(71) Applicants: Duane Condon, Ramona, CA (US); LSP Products Group, Inc., Irving, TX (US)

(72) Inventors: Duane Condon, Ramona, CA (US); Bill Ghiglieri, Reno, NV (US)

(73) Assignee: LSP PRODUCTS GROUP, INC., Irving, TX (US)

( * ) Notice: Subject to any disclaimer, the term of this patent is extended or adjusted under 35 U.S.C. 154(b) by 0 days.

(21) Appl. No.: 14/568,583

(22) Filed: Dec. 12, 2014

(65) Prior Publication Data

US 2015/0096640 A1  Apr. 9, 2015

Related U.S. Application Data

(63) Continuation-in-part of application No. 13/837,256, filed on Mar. 15, 2013, now Pat. No. 8,939,177, and a continuation-in-part of application No. 14/109,116, filed on Dec. 17, 2013.

(51) Int. Cl.
F16L 55/04 (2006.01)
F16L 55/053 (2006.01)
F16L 55/045 (2006.01)
F16L 55/05 (2006.01)

(52) U.S. Cl.
CPC ............ *F16L 55/053* (2013.01); *F16L 55/045* (2013.01); *F16L 55/05* (2013.01)

(58) Field of Classification Search
CPC ...... F16L 55/043; F16L 55/045; F16L 55/053
USPC ................ 138/30, 31, 26; 137/837, 256, 504
See application file for complete search history.

(56) References Cited

U.S. PATENT DOCUMENTS

| 2,729,244 | A | | 9/1952 | Alaska et al. | |
|---|---|---|---|---|---|
| 3,536,102 | A | | 10/1970 | Allewitz et al. | |
| 4,991,876 | A | | 2/1991 | Mulvey | |
| 5,819,802 | A | * | 10/1998 | Fan | 138/31 |
| 5,865,209 | A | * | 2/1999 | Vidal | 137/216 |
| 5,996,632 | A | | 12/1999 | Vogel et al. | |
| 6,089,274 | A | | 7/2000 | Fan | |
| 6,672,337 | B2 | | 1/2004 | Kobayashi et al. | |
| 7,156,120 | B2 | | 1/2007 | Cherfane et al. | |
| 8,307,855 | B2 | | 11/2012 | Al-Khomairi | |
| 8,517,057 | B2 | * | 8/2013 | Rose et al. | 138/30 |
| 2002/0129861 | A1 | | 9/2002 | Holdenried | |
| 2007/0209707 | A1 | | 9/2007 | Weltman | |
| 2013/0299029 | A1 | | 11/2013 | Spedding | |

FOREIGN PATENT DOCUMENTS

EP 0440360 1/1990
FR 1081881 5/1953

* cited by examiner

*Primary Examiner* — Patrick F Brinson
(74) *Attorney, Agent, or Firm* — Ross Barnes LLP; Monty L. Ross; Robin L. Barnes

(57) ABSTRACT

An in-line water hammer arrester comprises a housing connectable at each end to a piping system, a fluid channel disposed within the housing to permit fluid to flow from the piping system through the housing and back into the piping system, a piston and a pressurized chamber. When a pressure spike occurs, the piston is pushed against the pressurized chamber allowing an expanded area for water flow until the pressure spike is dissipated and the piston returns to its resting position. When used with flexible hoses and tubing typically found with household appliance water supply lines, the in-line arrester is easily installed by a crimping or clamping type connector and takes up little space.

12 Claims, 15 Drawing Sheets

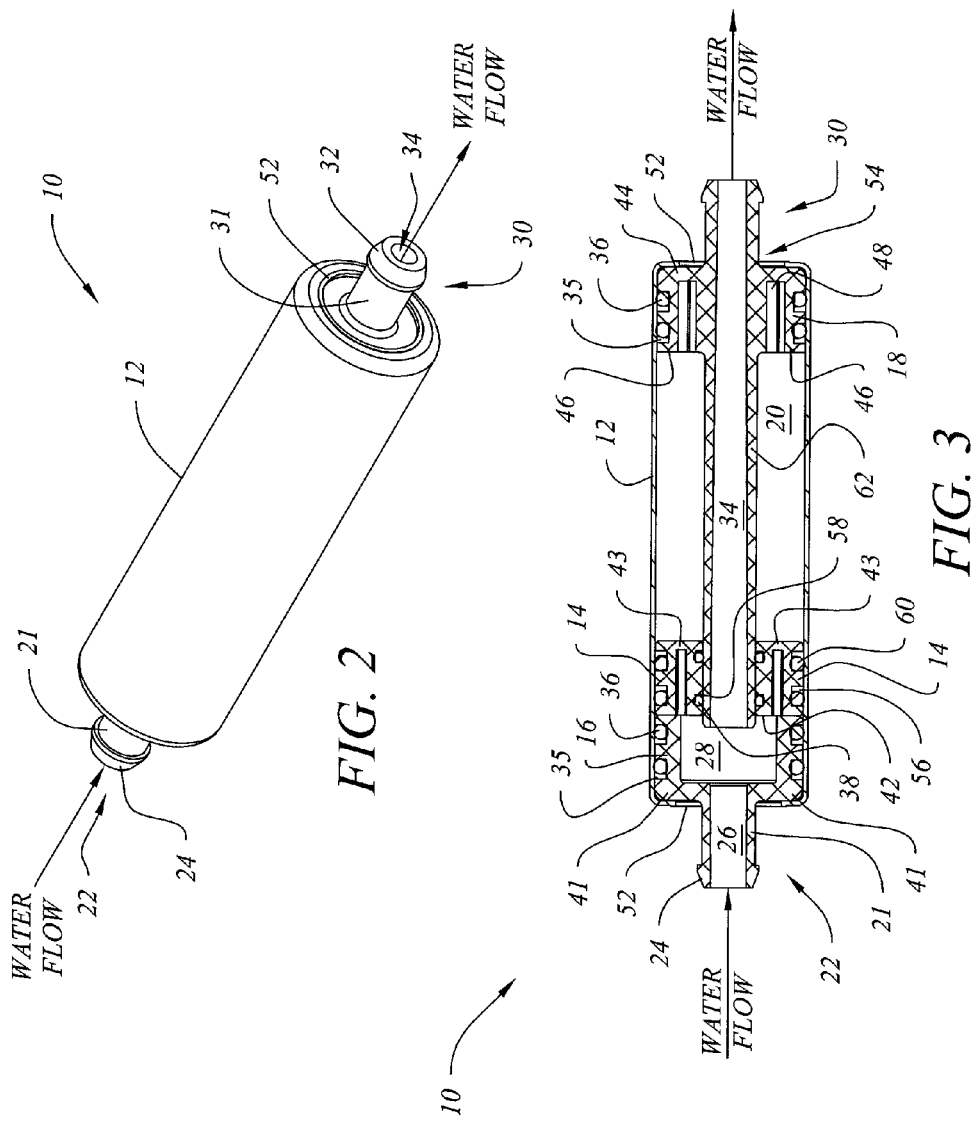

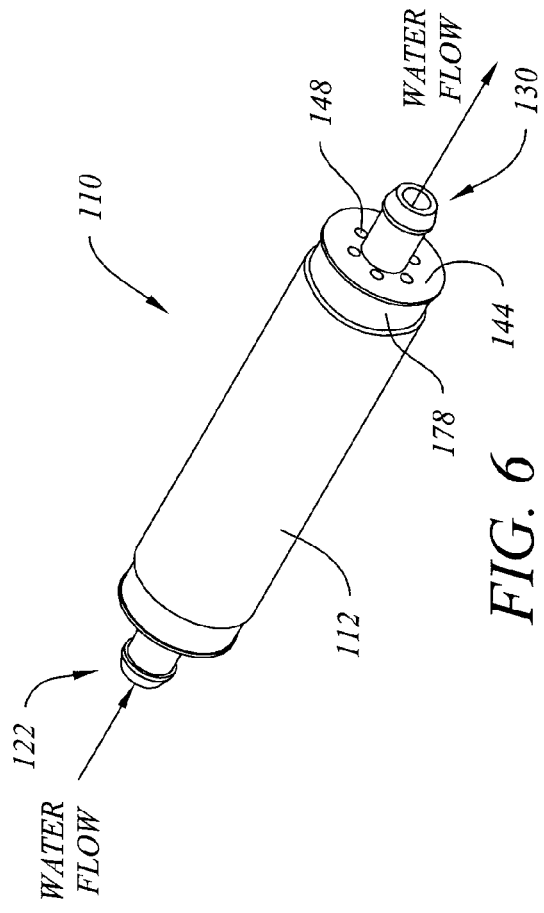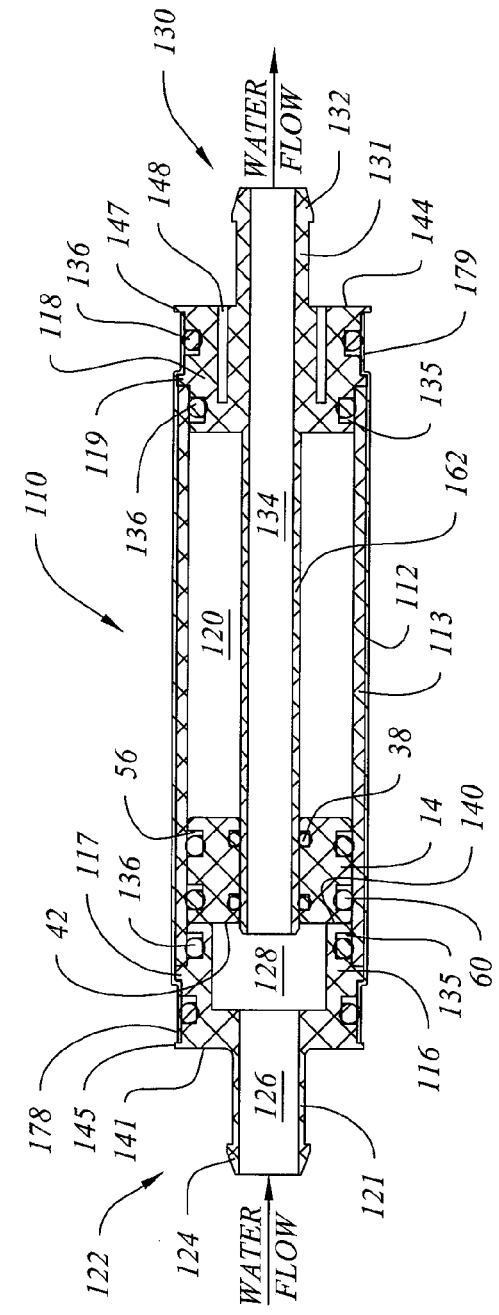

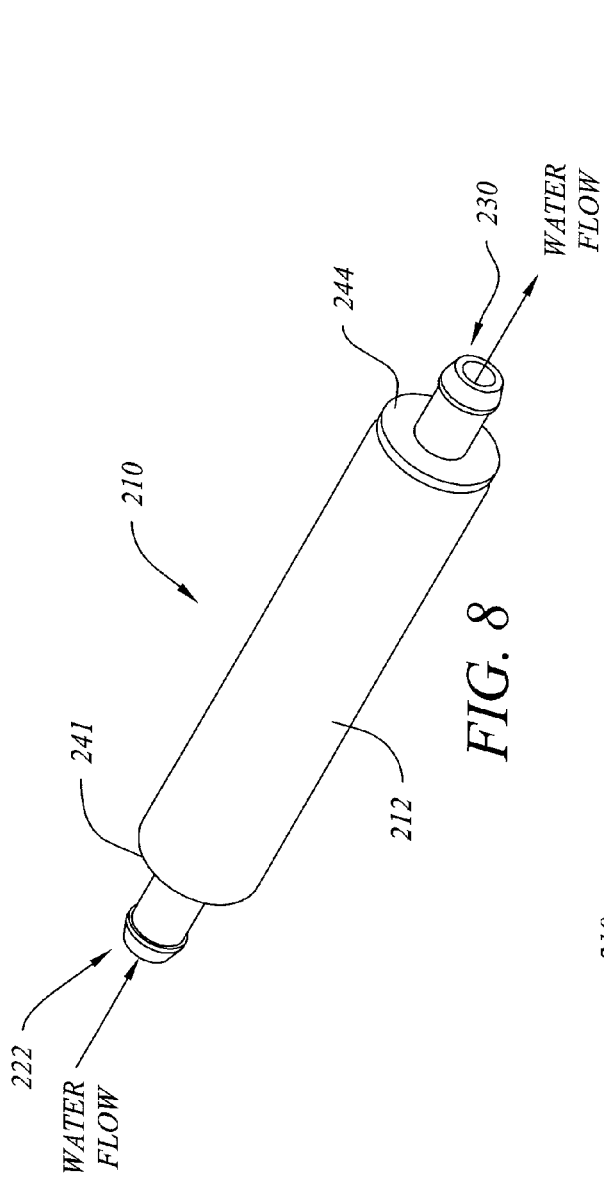
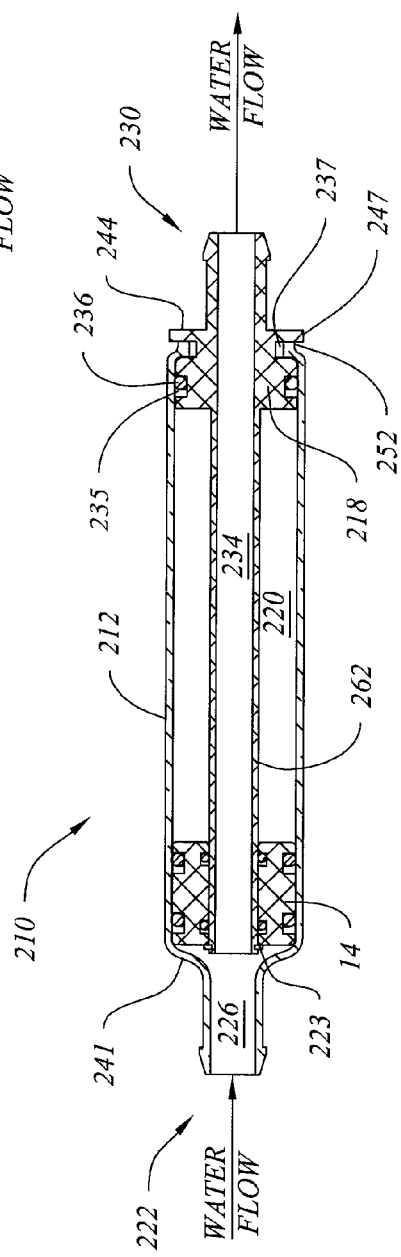
FIG. 8
FIG. 9

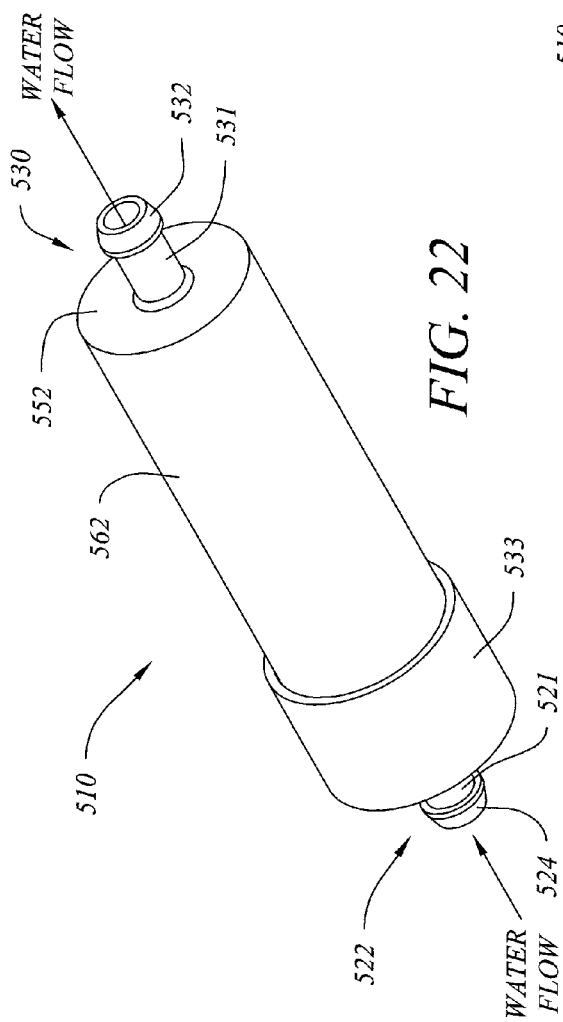
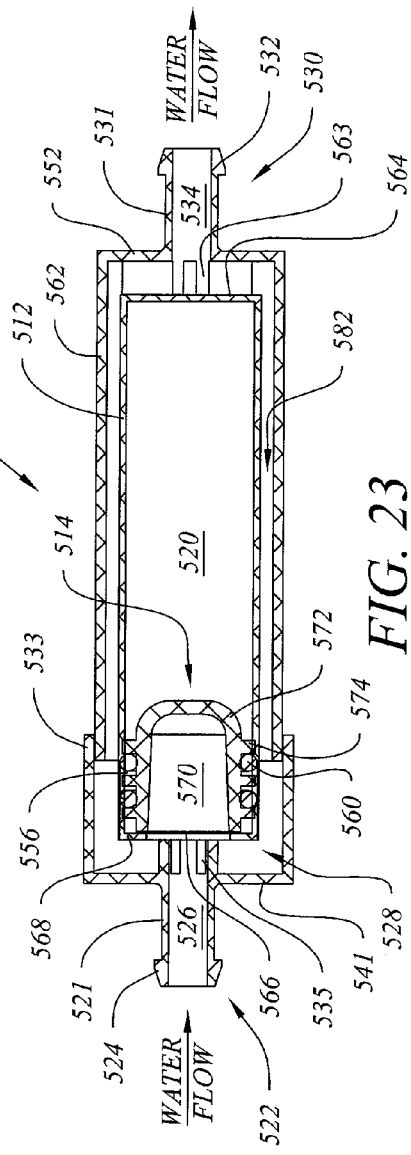
FIG. 22
FIG. 23

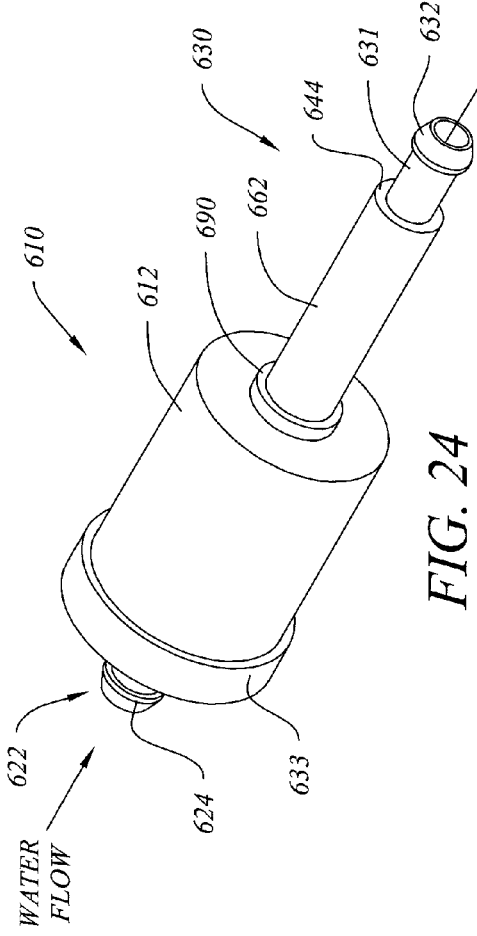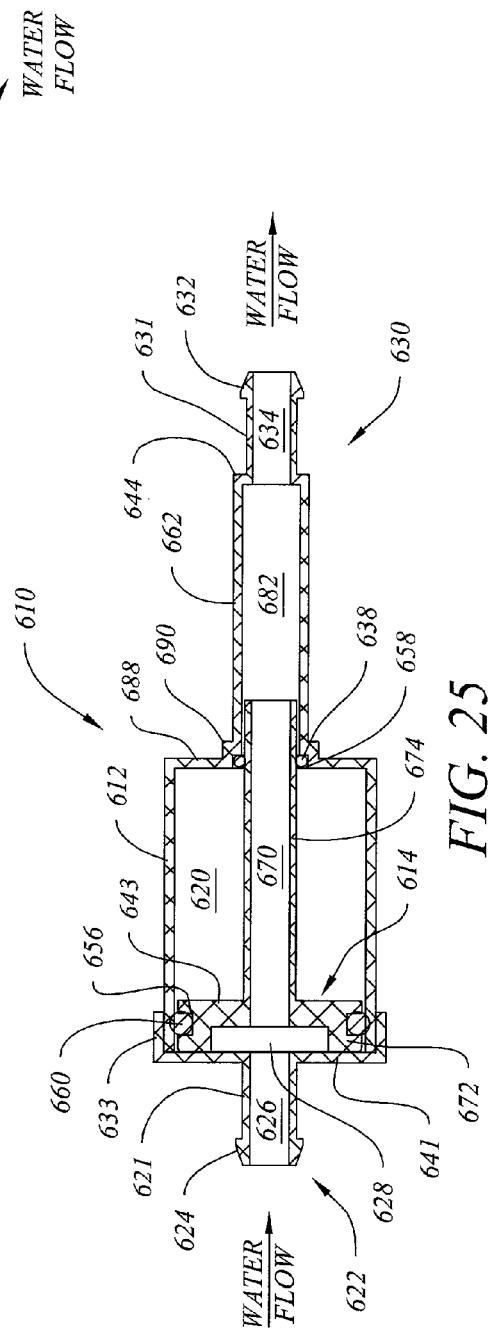

IN-LINE WATER HAMMER ARRESTER

CROSS-REFERENCE TO RELATED APPLICATIONS

This application is a continuation-in-part of U.S. application Ser. No. 13/837,256 filed on Mar. 15, 2013 and a continuation-in-part of U.S. application Ser. No. 14/109,116 filed on Dec. 17, 2013.

BACKGROUND OF THE INVENTION

1. Field of the Invention

This invention relates to an in-line device for dampening pressure spikes and reducing "water hammer" caused by abrupt pressure changes within a pipe, hose, or flexible tubing when the flow of water (or other fluid flowing through the system) is shut-off.

2. Description of Related Art

Water hammer is a common occurrence when there is a sudden change in pressure in a pipe caused by shutting-off the flow of water through the pipe. Pressure spikes associated with quick shut-off valves can be 5 times or more greater than the normal pressure within the system. These changes in pressure may cause rattling and shaking of the pipes, producing the typical "hammering" noise associated with this problem, although the pressure change may cause damage to the piping system even when there is no hammering noise. The pressure spike can reverberate backward from a valve and cause damage to parts throughout the system, including fittings, valves, backflow preventers, and appliances connected to the piping system.

One way of preventing water hammer is by installing a water hammer arrester. These devices typically include a pipe, capped at one end, with a piston and a pressurized air pocket between the piston and the capped end, with the open end of the pipe connected to a pipe in the system just upstream of where a pressure spike may occur or connected at a valve and typically included in a valve outlet box. The arrester is typically installed perpendicular to the system pipe. When a pressure spike occurs, the pressurized water pushes against the piston in the arrester, which moves against the compressed air pocket until the pressure is stabilized and the piston returns to its normal, resting position within the arrester. This dampens the pressure so that it does not reverberate back through the piping system.

This type of prior art hammer arrester works well with fixed piping installations, but requires extra room for installation and larger sized outlet boxes to accommodate the arrester. Additionally, it is more difficult to install since it typically involves soldering pipe, compression joints, crimping on to PEX, or other various means of connections. If it becomes necessary to retro-fit a piping system with a hammer arrester, then the difficulty increases since it is more difficult to access piping within walls or to add a hammer arrester at an existing outlet box. This usually requires the assistance of a professional plumber and is not usually a do-it-yourself job for the average homeowner. Moreover, this type of design does not work with flexible hoses and tubing typically found on washing machines, dishwashers, and refrigerators/ice makers, even though the valves used with these appliances may cause severe pressure spikes.

In-line type arresters are also known, which have advantages over a T-connector style arrester, but these use dampening materials rather than pistons. For example, U.S. Pat. No. 6,672,337 discloses a cushioning diaphragm around a fluid chamber and U.S. Pat. No. 8,307,855 discloses a set of gas-filled balloons within a larger diameter pipe for dampening the pressure spike. A piston is more effective than cushioning materials.

SUMMARY OF THE INVENTION

The water hammer arrester apparatus disclosed herein may be added to standard and preexisting flexible hoses and tubing typically found on supply lines for washing machines, dishwashers, and refrigerators/ice makers. According to one embodiment of the invention, the water hammer arrester is installed in-line in a flexible hose by crimping or otherwise sealing the water hammer arrestor in the middle of a standard hose. This way a water hammer arrestor installation is as easy for the average homeowner as installing a standard hose and it can be done without requiring professional assistance. Moreover, the apparatus is relatively small and the diameter is only slightly larger than the typical diameter of flexible hose supply lines for household appliances, so it can easily fit in the same space that housed a standard flexible supply line before installation of the arrester with supply line. With the use of the apparatus according to an embodiment of the invention, it would not be necessary to install arresters in a valve outlet box, which will allow for smaller boxes which are less expensive.

According to another embodiment of the invention, the water hammer arrestor comprises a piston and a pressurized chamber, similar to prior art devices, but the arrestor is in-line with the system and the water passes through the arrester. This in-line design allows the arrester to be compact and easy to install on existing flexible hoses or tubing.

These and other features, objects and advantages of the present invention will become better understood from a consideration of the following detailed description of the preferred embodiments and appended claims in conjunction with the drawings. Although the discussion of the preferred embodiment will focus on use of the apparatus with flexible hoses and tubing, the invention may be used with copper pipe, CPVC pipe, PEX pipe, and other hard surface piping systems with different means of connecting the ends of the apparatus in-line with these pipes, as will be understood by those of ordinary skill in the art. Additionally, the invention may be installed inside an appliance, such as a washing machine or dishwasher, by the manufacturer of the appliance, as will also be understood by those of ordinary skill in the art.

BRIEF DESCRIPTION OF THE DRAWINGS

The apparatus of the invention is further described and explained in relation to the following drawings wherein:

FIG. 2 is a perspective view of one embodiment of an apparatus according to the invention;

FIG. 3 is cross-sectional side elevation view of the apparatus of FIG. 2 with the piston in its resting position;

FIG. 6 is a perspective view of another embodiment of an apparatus according to the invention;

FIG. 7 is a cross-sectional side elevation view of the apparatus of FIG. 6 with the piston in its resting position;

FIG. 8 is a perspective view of another embodiment of an apparatus according to the invention;

FIG. 9 is a cross-section side elevation view of the apparatus of FIG. 8;

FIG. 22 is a perspective view of another embodiment of an apparatus according to the invention;

FIG. 23 is cross-sectional side elevation view of the apparatus of FIG. 22 with the piston in its resting position;

FIG. 24 is a perspective view of another embodiment of an apparatus according to the invention;

FIG. 25 is cross-sectional side elevation view of the apparatus of FIG. 24 with the piston in its resting position;

DESCRIPTION OF THE PREFERRED EMBODIMENTS

Figure 1:
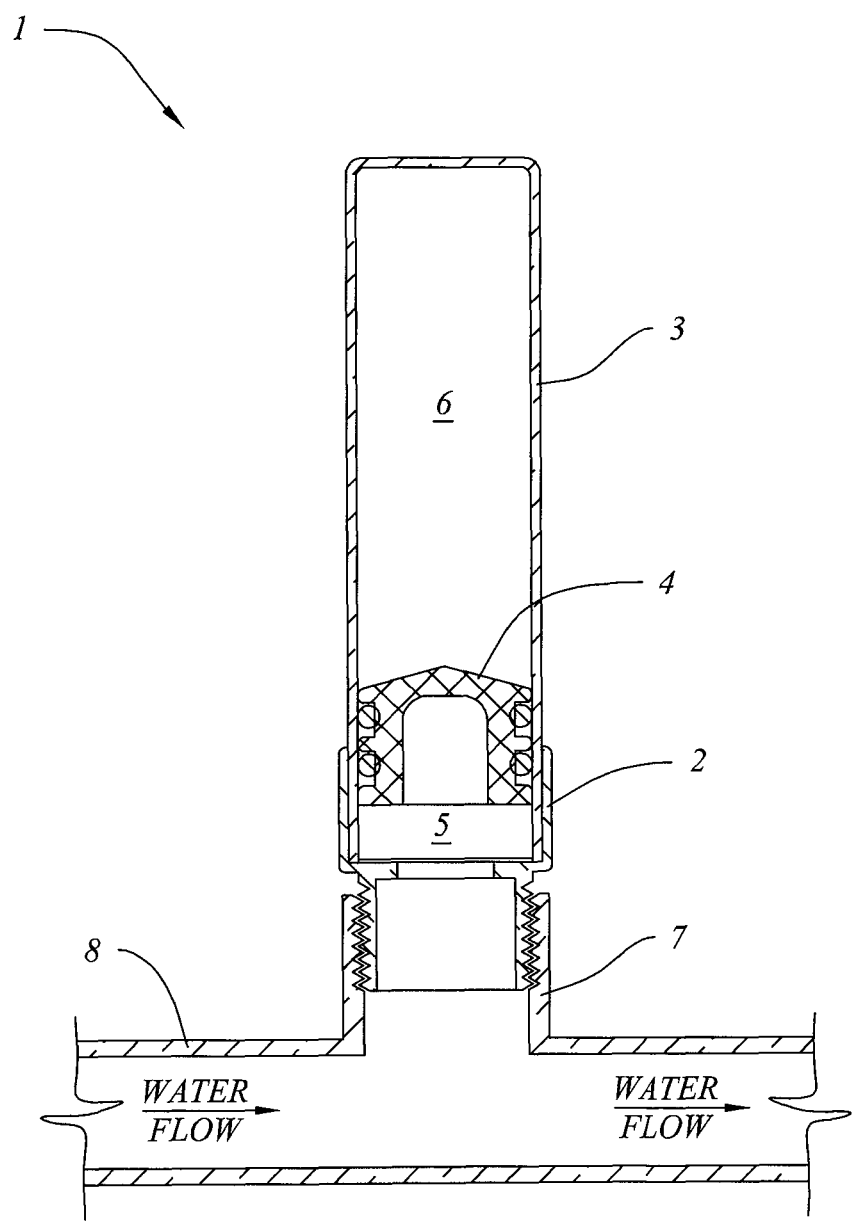
FIG. 1 is a cross-sectional view of a typical prior art T-connector water hammer arrester.

Referring to FIG. 1, a typical prior art hammer arrester 1 is shown. Arrester 1 comprises an end fitting 2, generally u-shaped housing 3, and a piston 4. End fitting 2 is attached, usually by a threaded or soldered connection, to a tee 7 extending perpendicularly from a pipe 8. A fluid chamber 5 is disposed within end fitting 2. A pressurized chamber 6, usually filled with air, is disposed inside housing 3. When a pressure spike occurs, the force of fluid or water flowing through. T-connector 7 and through end fitting 2 causes piston 4 to move toward the sealed end of housing 3 as fluid chamber 5 expands to accommodate the additional fluid from pipe 8. When the pressure normalizes, piston 4 moves back to its resting position (as shown in FIG. 1). The fluid or water in the system does not flow through (from one end and out through the other end) arrester 1, but flows into and back out of the same opening in end fitting 2. When installed in a typical orientation, the longitudinal axis of arrester 1 is perpendicular to the longitudinal axis of pipe 8 and perpendicular to the primary flow direction of fluid or water through the system. Adding arrester 1 to an existing piping system usually requires cutting the pipe or hose, installing T-connector 7, and connecting arrester 1. Depending on the materials used, this may require the use of harmful and malodorous solvents or the use of solder and a torch, making installation much more difficult for the average homeowner to handle without assistance from a professional plumber.

Referring to FIG. 2, one preferred embodiment of an in-line water arrester apparatus 10 is depicted. Apparatus 10 preferably comprises a substantially cylindrical outer housing or body 12 having a shoulder 52 at each end, a first end fitting 22, a second end fitting 30, and a longitudinal fluid channel 34. During normal operation of a piping system (including a system using hard pipe material or flexible hoses or tubing), fluid (usually water) flows from first fitting 22 (the upstream or rearward end) toward the second fitting 30 (the downstream or front end). Apparatus 10 is installed upstream from a valve that would close and create a pressure spike. Typically, such a valve is part of the appliance with which the arrester is being used. For use with a washing machine, for example, arrester 10 would be installed in the flexible water supply line between the water supply valve (which is usually left in the on position and is not the source of the pressure spike) installed in the outlet box at the wall and the washing machine. Each end fitting 22 and 30 preferably comprises a barbed end 24 and 32 and a neck portion 21 and 31 that extends outwardly beyond shoulder 52. Alternatively, arrester 10 may be installed inside an appliance, most preferably by the manufacturer of the appliance, near the appliance valve that may cause water hammer.

Figure 4:
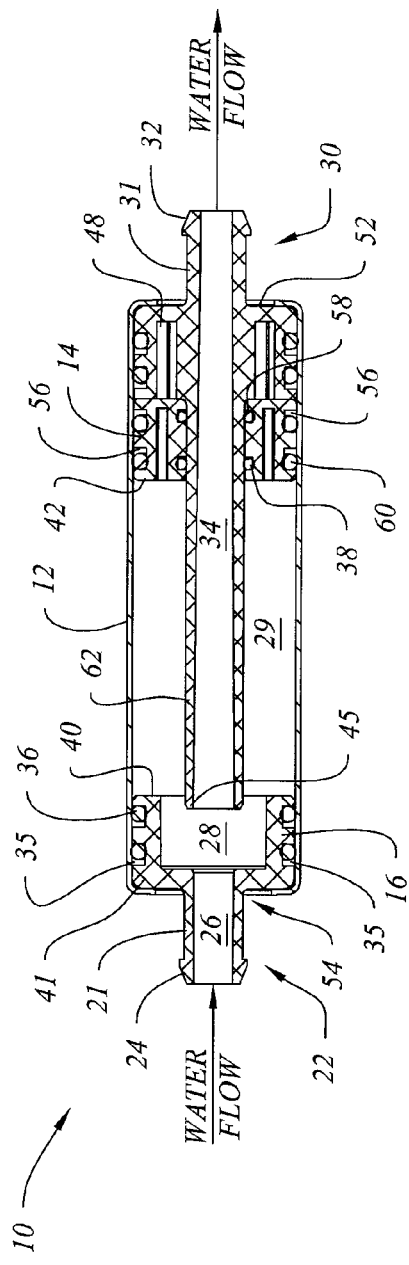
FIG. 4 is a cross-sectional side elevation view of the apparatus of FIG. 2 with the piston in fully compressed position.

A preferred embodiment of arrester apparatus 10 is depicted in FIGS. 3 and 4. Arrester apparatus 10 comprises outer housing or body 12, first end fitting 22, second end fitting 30, piston 14, pressurized chamber 20, and fluid channels 34, 28, and 26. First end fitting 22 is disposed at the upstream end of housing 12. First end fitting 22 comprises a cylindrical body 16 having an interior (or downstream) end 40 and a shoulder 41, a cylindrical neck 21 extending outwardly from shoulder 41, and barbed end 24. Shoulder 41 abuts shoulder 52 of housing 12. Neck 21 extends outwardly (upstream) from housing 12 through aperture 54. Barbed end 24 is preferably widest near neck 21 and tapers as it extends outwardly from neck 21 to facilitate insertion into a flexible hose, with the widest, barbed portion helping to secure the barbed end 24 from dislodging from the flexible hose. A longitudinal fluid channel 26 extends through barbed end 24 and neck 21. Another fluid channel 28 is formed on the interior of cylindrical body 16. Fluid channel 28 has a larger diameter than fluid channel 26. Fluid, typically water flowing through the piping system, may freely flow from fluid channel 26 to fluid channel 28 when water is flowing through the system. At least one, and preferably at least two, annular recesses 35 are disposed within an exterior surface of a sidewall of body 16. Disposed within each annular recess 35 is a sealing ring 36, which frictionally engages an interior wall of housing 12 to secure first end fitting 22 within housing 12 and prevent water from leaking between housing 12 and first end fitting 22.

Second end fitting 30 is disposed at the downstream end of outer housing or body 12. Second end fitting 30 comprises a substantially cylindrical body 18 having an interior (or upstream) end 46 and a shoulder 44, a cylindrical fluid shaft 62, a cylindrical neck 31 extending outwardly from shoulder 44, and barbed end 32. At least one, and preferably at least two, annular recesses 35 are disposed within an exterior surface of a sidewall of body 18 that is adjacent an interior wall of housing 12. Disposed within each annular recess 35 is a sealing ring 36, which frictionally engages an interior wall of cylindrical housing 12 to secure second end fitting 30 within housing 12 and prevent material from leaking out of pressurized chamber 20 between housing 12 and second end fitting 30. Shoulder 44 abuts shoulder 52 of cylindrical housing 12. Neck 31 extends outwardly (downstream) from housing 12 through aperture 54. Barbed end 32 is preferably widest near neck 31 and tapers as it extends outwardly from neck 31 to facilitate insertion into a flexible hose, with the widest, barbed portion helping to secure the barbed end 32 from dislodging from the flexible hose.

Fluid shaft 62 extends inwardly (upstream) from neck 31. An upstream end 45 of fluid shaft 62 extends partially into fluid chamber 28. An annular chamber 48 is formed between body 18 and fluid shaft 62. Chamber 48 helps facilitate molding of body 18. Circumferentially spaced holes may also be partially disposed in body 18 to facilitate molding. A longitudinal fluid channel 34 extends through barbed end 32, neck 31, and fluid shaft 62. Fluid channels 26, 28, and 34 cooperate to provide a continuous fluid channel through arrester apparatus 10. Pressurized chamber 20 is formed between an interior wall of housing 12, an exterior wall of fluid shaft 62, end 43 of piston 14, and end 46 of body 18. The total assembly should meet the latest edition of ASSE 1010 testing standards to adequately reduce the impact of a pressure spike in the system. Although air is the preferred gas to use in pressurized chamber 20, other gases, preferably inert gases such as nitrogen, may also be used. Other materials, such as water or gel, foam, or mechanical structures (such as springs) may also be used with pressurized chamber 20.

Apparatus 10 is preferably assembled by placing piston 14 over shaft 62, inserting end fittings 22 and 30 inside housing 12, hermetically sealing and pressurizing chamber 20 (preferably to 35-45 psi), and otherwise sealing end fittings 22 and 30 to housing 12. Preferably, housing 12 is initially a cylindrical piece of pipe that can be swaged to form shoulders 52 at each end over the shoulders 41 and 44 of the end fittings 22 and 30. Once shoulders 52 are formed, the fluid pressure within the apparatus holds the end fittings 22 and 30 in place against housing 12.

Figure 5:
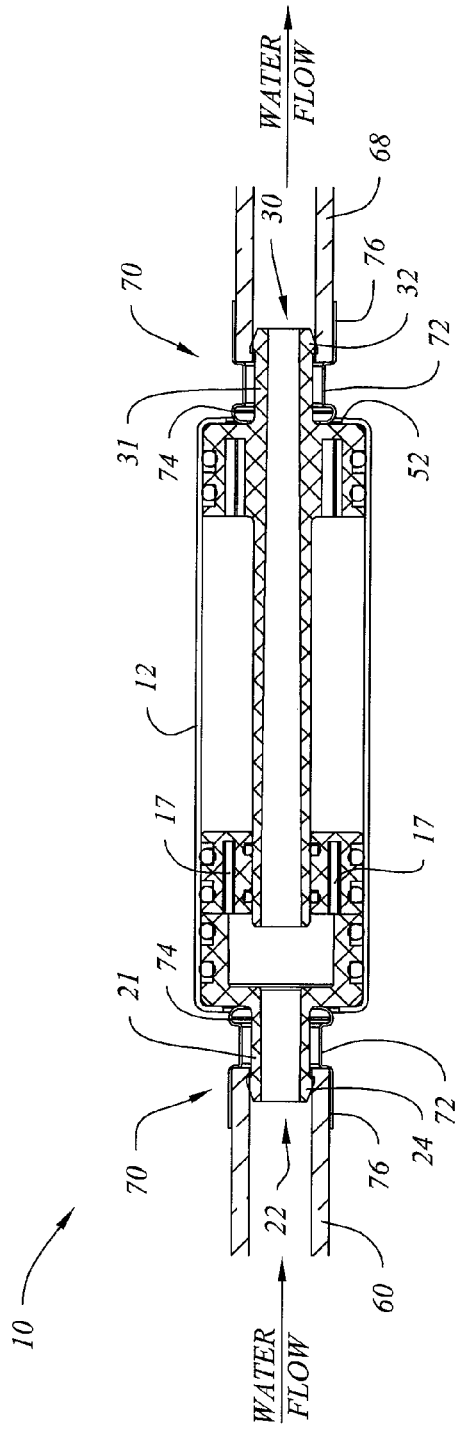
FIG. 5 is cross-sectional side elevation view of the apparatus of FIG. 2 as connected to a flexible hose.

A preferred embodiment of water hammer arrester apparatus 10, as installed on a flexible hose, is depicted in FIG. 5. Flexible hose 68 connected to a water supply line and an appliance, for example, is cut to expose two open ends. A clamp or crimp-type connector 70 is inserted over each of barbed ends 24 and 32 and abuts a recessed area on shoulder 52 of housing 12 (the recessed area best viewed in FIG. 1). Connector 70 preferably has a hose end 76, a neck 72, and a shoulder end 74. A cut end of hose 68 is inserted into hose end 76 of connector 70 and barbed end 24 is inserted into the cut end of hose 68 inside connector 70. The other cut end of hose 68 is similarly inserted into hose end 76 of the second connector 70 and barbed end 32 is inserted into the cut end of hose 68 inside the second connector 70. Each connector 70 is then crimped or clamped to secure hose 68 to arrester apparatus 10. Any other type of connector suitable for use with flexible hoses or tubing, may be used to connect hose 68 to arrester apparatus 10. Arrester apparatus 10 may be preassembled with shoulder end 74 of connector 70 attached at both ends of apparatus 10, two connectors 70 may come pre-packaged with apparatus 10, or connectors may be purchased separately from apparatus 10. Arrester apparatus 10 may also be used with copper pipe, CPVC, PEX or other hard piping systems using suitable connectors to connect the arrester to the piping as will be understood by those of ordinary skill in the art. Although not shown in the drawings, the ends of hoses 60 and 68 preferably abut shoulder 74.

Alternatively, arrester 10 may include threaded or crimping or clamping type connectors pre-attached to or integrally manufactured with either end fittings 22 and 30 and/or housing 12. Such connectors may include washers or similar fittings to prevent water leakage. Such connectors would mate with similar connectors installed on a flexible hose or tubing or piping with which arrester 10 is to be used. In this alternate configuration, barbed ends 24 and 32 may not be necessary and it may not be necessary for necks 21 and 31 to extend outwardly from housing 12. As yet another alternative, arrester 10 may be integrated with or pre-attached to a flexible hose, tubing, or a length of pipe for easier installation. For example, the ends of a flexible hose may come with threaded connectors that are ready to attach to the water supply valve and the inlet of a washing machine, with the arrester 10 already in place on the flexible hose so the user need only tighten the connections at the valve and washer inlet, rather than cutting the hose and having to install the arrester with crimp connectors. Those of ordinary skill in the art will understand the modifications that would be needed for such alternate connection configurations.

First end fitting 22, second end fitting 30, and piston 14 are each preferably unitarily molded as a single part. The preferred materials for first end fitting 22, second end fitting 30, and piston 14 are Acetal, but other plastic or metal materials, such as polysulfone, polyphynelsulfone, steel, brass, or other copper alloy, may also be used. Sealing rings 36, 38, and 60 are preferably standard o-rings. Most preferably, sealing rings 38 are smaller in size than sealing rings 36 and 60, which may be the same size. Additionally, annular recesses 35 on the first end fitting and the second end fitting may be the same size or different sizes, with the sealing rings 36 sized accordingly. Housing 12 is most preferably made of stainless steel, but other materials, such as copper or aluminum or other metals or plastics may also be used.

Referring to FIGS. 6-7, another preferred embodiment of an in-line water arrester apparatus 110 is depicted. Apparatus 110 preferably comprises a substantially cylindrical outer housing or body 112, a substantially cylindrical interior housing or body 113, a first end fitting 122, a second end fitting 130, and a piston 14. A crimp portion 178 is disposed at each end of outer housing or body 112. First end fitting 122 is disposed at the upstream end of housing 112 and comprises a substantially cylindrical body 116, an annular shoulder 141, a substantially cylindrical neck 121 extending outwardly from shoulder 141, and barbed end 124. An upstream end of housing 112 abuts shoulder 141. Preferably, shoulder 141 has an outwardly protruding lip 145 and cylindrical body has an outwardly protruding lip 117. Housing 112 is preferably crimped between lips 145 and 117, forming crimped portion 178, to secure first end fitting 122 within housing. A longitudinal fluid channel 126 extends through barbed end 124 and neck 121. Another fluid channel 128 is formed on the interior of cylindrical body 116.

Second end fitting 130 is disposed at the downstream end of housing 112. Second end fitting 130 comprises a substantially cylindrical body 118, an annular shoulder 144, a substantially cylindrical fluid shaft 162 extending inwardly (upstream) from body 118, a substantially cylindrical neck 131 extending outwardly from shoulder 144, and a barbed end 132. A downstream end of housing 112 abuts shoulder 144.

Preferably, shoulder 144 has an outwardly protruding lip 147 and body 118 has an outwardly protruding lip 119. Housing 112 is preferably crimped between lips 119 and 147, forming crimped portion 179, to secure second end fitting 130 within housing. An upstream end of fluid shaft 162 extends partially into fluid chamber 128. One or more holes 148 may be provided in body 118 to facilitate molding. A longitudinal fluid channel 134 extends through barbed end 132, neck 131, body 118, and fluid shaft 162. Fluid channels 126, 128, and 134 cooperate to provide a continuous fluid channel through arrester apparatus 110. Pressurized chamber 120 is formed between an interior wall of housing 113, an exterior wall of fluid shaft 162, the downstream end of piston 114, and the upstream end of body 118.

At least one, and preferably at least two, annular recesses 135 are disposed within an exterior surface of a sidewall of body 118 and of body 116. Disposed within each annular recess 135 is a sealing ring 136, which frictionally engages an interior wall of crimp portions 178 and 179 and/or an interior wall of housing 113 to secure second end fitting 130 and first end fitting 122 within housing 112 and housing 113. A single recess 135 and a single sealing ring 136 may be also be used on either or both body 118 and 116 (as in FIG. 9A). If only a single sealing ring 136 is used, it is preferred that it be disposed in the interior most recess 135, to frictionally engage an interior of housing 113. Sealing rings 136 prevent leakage between end fittings 122 and 130 and housing 112 and housing 113.

First end fitting 122, second end fitting 130, and interior housing 113 are each preferably unitarily molded as separate, single parts from plastic materials. Housing 112 is preferably stainless steel, but other metals such as copper or aluminum, and plastics may also be used. When assembled, crimp portions 178 and 179 are crimped to secure the end fittings 122 and 130 together with housing 112, with housing 113 disposed inside housing 112 and between lips 117 and 119 of the end fittings. Other methods of connection suitable for the materials from which these parts are manufactured may also be used.

Apparatus 110 is preferably assembled by placing piston 14 over shaft 162, inserting interior housing 113 in housing 112, inserting end fittings 122 and 130 inside housing 112 and 113, hermetically sealing and pressurizing chamber 120 (preferably to 35-45 psi), and crimping housing 112 at crimp portions 178 and 179 to secure the end fittings 122, 130 inside housing 112.

Referring to FIGS. 8-9, another preferred embodiment of an in-line water arrester apparatus 210 is depicted. Apparatus 210 preferably comprises a first end fitting 222, a second end fitting 230, and a piston 14. End fitting 230 is preferably a tube made of copper or copper alloy that is swaged into shape. First end fitting 222 is also preferably a tube made of copper or a copper alloy and is swaged into shape and joined with end fitting 230 at shoulders 252 and 244. Although copper or copper alloys are preferred, other materials may be used and other methods of joining the two fittings suitable for the particular materials may be used.

First end fitting 222 is disposed at the upstream end of arrester 210. First end fitting preferably comprises a cylindrical body 212, annular shoulder 241, a barbed end 224, and a neck portion 221 extending outwardly (upstream) from annular shoulder 241. Barbed end 224 is disposed at the upstream end of neck 221. A longitudinal fluid channel 226 extends through barbed end 224 and neck 221.

Second end fitting 230 is disposed at the downstream end of arrester 210. Second end fitting 230 preferably comprises annular shoulder 244, a neck portion 231 extending outwardly (downstream) from shoulder 244, a barbed end 234 extending outwardly from neck 231, a substantially cylindrical body 218, and a cylindrical fluid shaft 262 extending inwardly (upstream) from body 218. Preferably, shoulder 244 has an outwardly protruding lip 247. An annular recess 235 is disposed within an exterior surface of a sidewall of body 218 and a sealing ring 236 is disposed within recess 235. The downstream end of body 218 comprises a shoulder around which cylindrical body 212 is swagged. Recess 237 is disposed between the downstream shoulder of body 218 and shoulder 244. End fitting 230 is preferably made of brass, but other materials may also be used. The downstream end 252 of body 212, which is preferably made of copper or a copper alloy, is preferably swaged between the downstream shoulder of body 218 and lip 247 to secure second end fitting 230 to first end fitting 222.

Apparatus 210 is preferably assembled by placing piston 14 over shaft 262, inserting end fitting 230 into body 212 of end fitting 222, hermetically sealing and pressurizing chamber 220 (preferably to 35-45 psi), and swaging together at shoulders 252 and 244 (or otherwise sealing end fittings 222 and 230 together, depending on the materials used).

Figure 10:
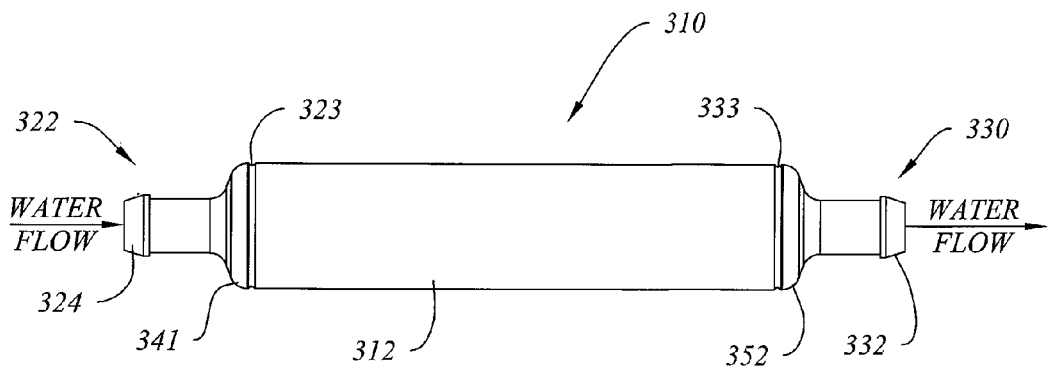
FIG. 10 is a side elevation view of another embodiment of an apparatus according to the invention.
Figure 11A:
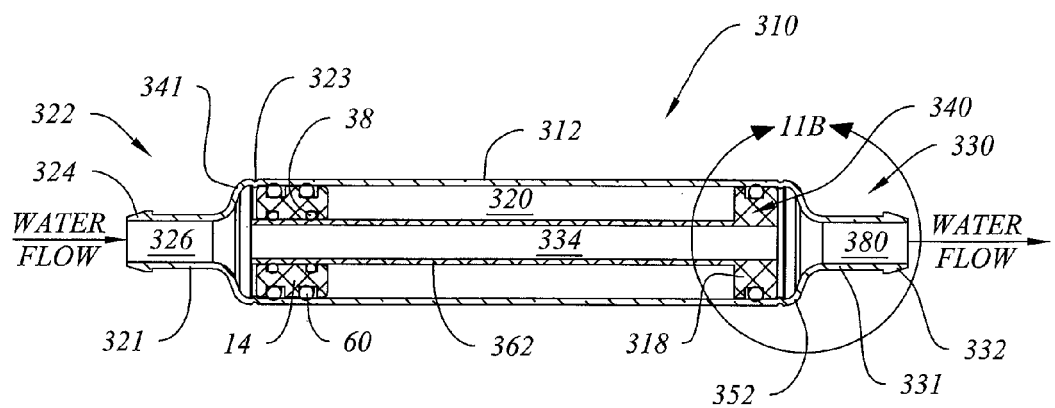
FIG. 11A is a cross-sectional side elevation view of the apparatus of FIG. 10 with the piston in its resting position.
Figure 11B:
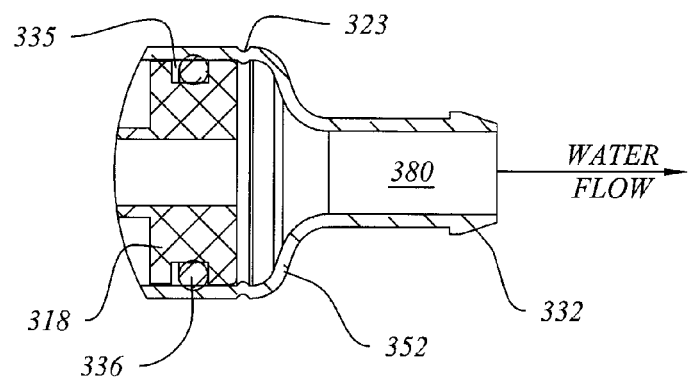
FIG. 11B is an enlarged view of a portion of FIG. 11A.

Referring to FIGS. 10-11B, another preferred embodiment of an in-line water arrester apparatus 310 is depicted. Apparatus 310 preferably comprises an outer housing or body 312, interior fitting 340, and piston 14. Interior fitting 340 preferably comprises a substantially cylindrical body 318 and a substantially cylindrical fluid shaft 362 extending upstream from body 318. A fluid channel 334 is disposed through the interior of shaft 362 and body 318. At least one annular recess 335 is disposed within an exterior surface of a sidewall of body 318 that is adjacent an interior wall of housing 312, as best seen in FIG. 11B. Disposed within each annular recess 335 is a sealing ring 336, which frictionally engages an interior wall of cylindrical housing 312. Pressurized chamber 320 is formed between an interior wall of housing 312, an exterior wall of fluid shaft 362, the downstream end of piston 14, and an upstream end of body 318. Sealing ring 336 also prevents material from leaking out of pressurized chamber 320 between housing 312 and interior fitting 340. Interior fitting 340 is preferably made of brass, but other materials may also be used.

Housing 312 is initially cylindrical in shape and preferably made of copper, but other materials may also be used. Interior fitting 340 is placed inside housing 312 and then the downstream end of housing 312 (nearest body 318) is swaged into shape to form an end fitting 330. End fitting 330 preferably comprises a shoulder 352, neck 331, and barbed end 332, with fluid channel 380 being disposed within end fitting 330. An annular inwardly projecting lip 333 is also formed in housing 312 near shoulder 352. Lip 333 prevents body 318 of interior fitting 340 from further movement in the downstream direction. Chamber 320 is formed on the exterior of shaft 362 and interior of housing 312. Chamber 320 is pressurized, piston 14 is inserted over shaft 362 to seal pressurized chamber 320, and the upstream end of housing 312 is swaged into shape to form an end fitting 320. End fitting 320 preferably comprises a shoulder 341, neck 321, and barbed end 321, with fluid channel 326 being disposed within end fitting 322. Fluid channels 326, 334, and 380 cooperate to provide a continuous fluid channel through arrester apparatus 310. An annular inwardly projecting lip 323 is also formed in housing 312 near shoulder 341. Lip 323 prevents piston 14 from further movement in the upstream direction. Most preferably, housing 312 retains a cylindrical shape between formed end fittings 322 and 330. Housing 312, interior fitting 340 and piston 14 are preferably separate components, but other configurations, such as separate end fittings 322 and 330 or interior fitting 340 being unitarily molded with end fitting 330 as a separate component, may also be used. The methods of joining these components together will vary according to the materials used and the configurations of the components as will be understood by those of ordinary skill in the art.

Piston 14 in arrester embodiments 10, 110, 210, and 310 is essentially the same piston, although different sizes and materials may be used according to each embodiment. Piston 14 is preferably substantially cylindrical and unitarily molded from plastic materials, but other materials and metals may be used. To facilitate molding, piston 14 may include an annular recess, such as recess 17 depicted in FIG. 5, or circumferentially spaced holes disposed partially through the body of the piston, as will be understood by those of ordinary skill in the art. At least one, and preferably at least two, annular recesses 56 are disposed within an exterior surface of a sidewall of piston 14. Additionally, at least one, and preferably at least two, annular recesses 58 are disposed within an interior surface of a sidewall of piston 14. Disposed within each annular recess 56 is a sealing ring 60, which provides slidable engagement between piston 14 and an interior wall of housing/body 12, 113, 212, or 312. Disposed within each annular recess 58 is another sealing ring 38, which provides slidable engagement between piston 14 and an exterior wall of fluid shaft 62, 162, 262, or 362. Alternatively, outwardly or inwardly protruding retaining members (similar to those depicted in FIG. 23 discussed below) or integral lips (similar to those depicted in FIGS. 13 and 19 discussed below) may be used instead of annular recesses 56 and 58. Similar retaining members or integral protruding lips may also be used in place of sealing rings for other parts of arresters according to the invention, such as to replace sealing ring 236. Sealing rings 60 and 38 prevent leakage between the various upstream fluid channels (e.g. 28) and pressurized chamber 20, 120, 220, or 320.

Under normal operating conditions, when the pressure in the piping system is stable, piston 14 is in its resting position as shown in FIGS. 3, 5, 7, 9A, 9C, and 11A. When at rest, the pressure in pressurized chamber 20, 120, 220, or 320 is greater than the pressure in the fluid system (e.g. the pressure in the upstream fluid channel nearest piston 14, such as fluid channel 28). At least a portion of the upstream end of piston 14 abuts another part of the arrester to prevent further rearward movement of piston 14 when the pressure in the pressurized chamber is greater than the pressure in the system, thus holding piston 14 in a resting position. In embodiments 10 and 110, part of end 42 of piston 14 abuts end 40 of body 16 or end 140 of body 116 as shown in FIGS. 3, 5, and 7. In embodiment 210, as shown in FIGS. 9A-9C, an annular lip 223 or similar protrusion may be disposed at or near the upstream end of shaft 262 to prevent piston 14 from rearward movement beyond lip 223. Alternatively, the upstream end of piston 14 may abut shoulder 241 with shaft 262 being longer than depicted in FIGS. 9A-9C so that piston 14 remains at least partially on shaft 262 when in the resting position. In embodiment 310, an inwardly projecting annular lip 323 prevents further rearward movement of piston 314 beyond the lip at the upstream end of housing 312. Alternatively, an upstream end of piston 14 may abut shoulder 341 in arrester 310. A lip or other protrusion to prevent further rearward movement of piston 14 may be incorporated at or near the upstream end of shaft 62, 162, 262, or 362, or at the upstream end of housing 12, 113, 212, or 312 in any of these embodiments.

When a pressure spike occurs, the pressure in the system (e.g. the pressure in the upstream fluid channel nearest piston 14, such as fluid channel 28) becomes greater than the pressure in pressurized chamber 20, 120, 220, or 320, causing piston 14 to move forward toward second end fitting 30, 130, 230, or 330. Piston 14 may move forwardly as needed to accommodate the pressure spike. For a severe spike, piston 14 may move forwardly until its downstream end abuts or nearly abuts the second end fitting, subject to the compressibility limits of the material within the pressurized chamber. In embodiment 10, end 43 abuts end 46 of second end fitting 30, as shown in FIG. 4 as chamber 48 may accommodate the material in chamber 20 when piston 14 is pushed all the way forward. If similar chambers or holes are not provided in the second end fittings, or such chambers or holes are not facing and open to the pressurized chamber, then piston 14 will not fully abut the second end fitting.

When the piston 14 is pushed forward from its resting position, an expanded fluid chamber, such as fluid chamber 29 as shown in FIG. 4, is formed. The expanded fluid chamber forms in an area inside housing/body 12, 113, 212, or 312, allowing a greater volume for the fluid in the system to fill. The shock of the pressure spike is transferred through the piston to the material in the pressurized chamber 20, 120, 220, or 320. As the pressure in the system stabilizes, piston 14 moves back to its resting position. This movement pushes fluid out of the expanded chamber and back into the upstream fluid channel nearest piston 14 (e.g. fluid channel 28) and then out through the other fluid channels within the arrester (e.g. channel 34) and allows re-expansion of a compressible material in pressurized chamber 20, 120, 220, or 320.

Figure 12:
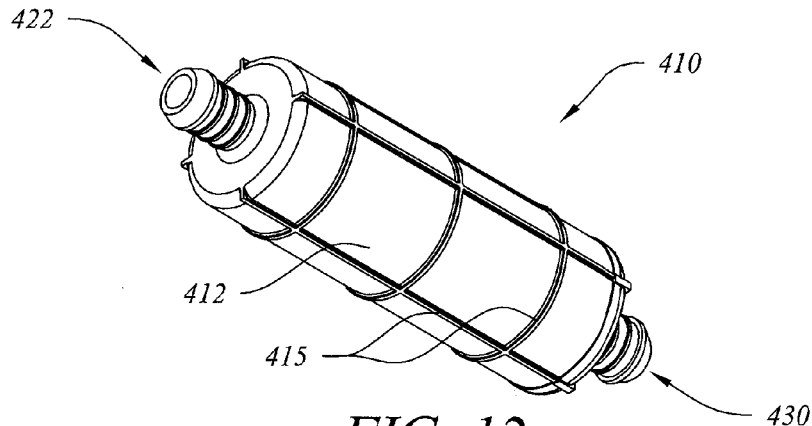
FIG. 12 is a perspective view of another embodiment of an apparatus according to the invention.
Figure 13:
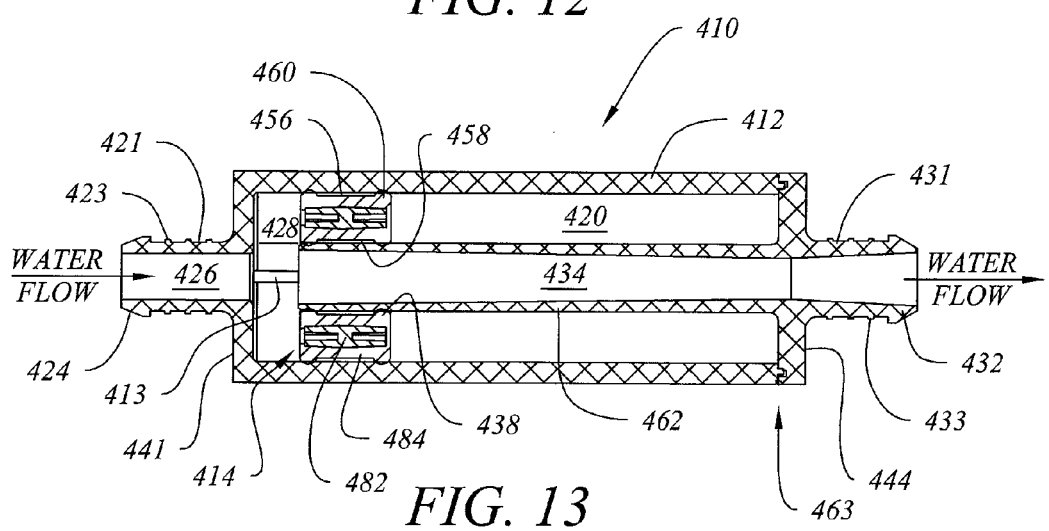
FIG. 13 is cross-sectional side elevation view of the apparatus of FIG. 12 with the piston in its resting position.
Figure 14:
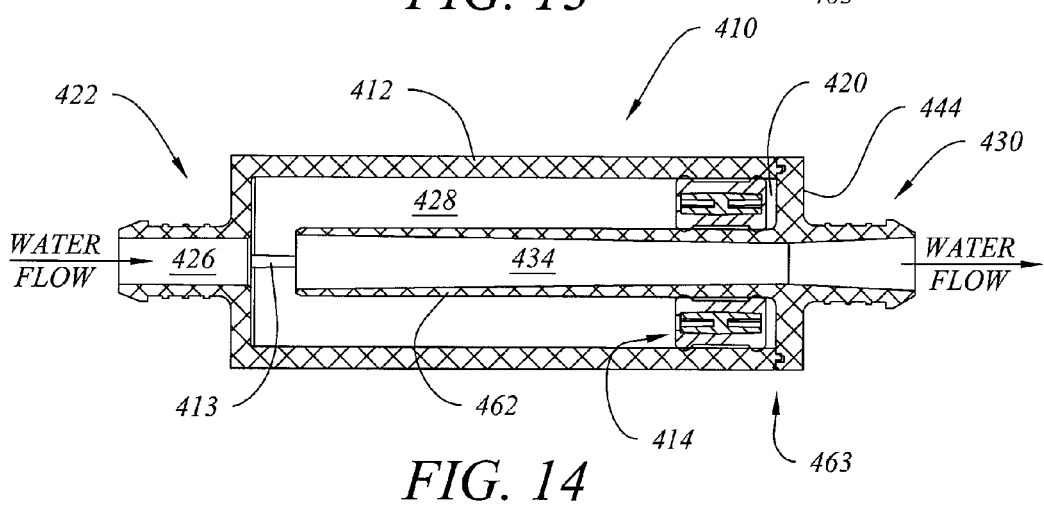
FIG. 14 is a cross-sectional side elevation view of the apparatus of FIG. 12 with the piston in fully compressed position.
Figure 15:
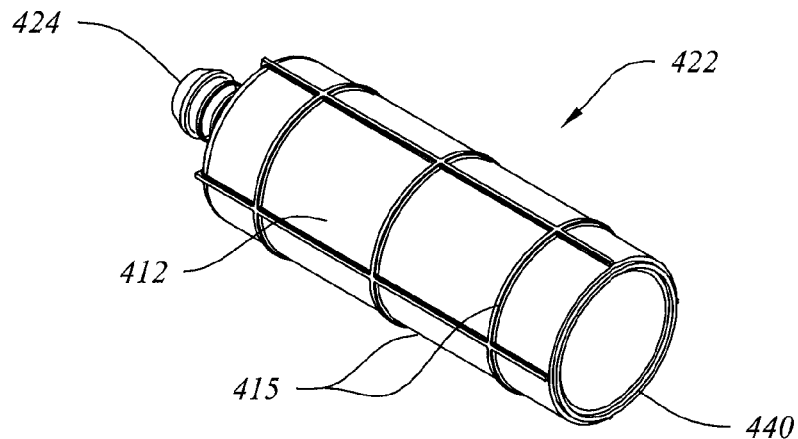
FIG. 15 is a perspective view of one embodiment of an end fitting according to the invention.

Referring to FIGS. 12-14, another preferred embodiment of an in-line water arrester apparatus 410 is depicted. Apparatus 410 preferably comprises a first end fitting 422, a second end fitting 430, and a piston 414. Pressurized chamber 420 is formed between an interior wall of body 412, an exterior wall of fluid shaft 462, a downstream end of piston 414, and annular shoulder 444. Piston 414 is shown in its resting position in FIG. 13, when no pressure spike is occurring and the pressure in pressurized chamber 420 is greater than the pressure in the system at fluid channel 428. One or more ribs 413 prevent piston 414 from sliding off the end of shaft 462. Preferably there are three ribs 413 spaced in substantially equidistant positions around the interior of shoulder 441. Piston 414 is shown in its compressed position in FIG. 14, when a pressure spike is occurring and the pressure in the system at fluid channel 428 is greater than the pressure in pressurized chamber 420. The position of piston 414 along shaft 462 between the resting and compressed positions will depend on the severity of the pressure spike and the compressibility of the material in the pressurized chamber. For a severe spike, piston 414 may move forwardly until its downstream end nearly abuts shoulder 444 (subject to the compressibility limits of the material inside pressurized chamber 420), as shown in FIG. 14. Fluid chamber 428 is formed between shoulder 441, a sidewall of body 412, a sidewall of fluid shaft 462, and the upstream end of piston 414. When piston 114 is pushed forward from its resting position, fluid chamber 428 expands as shown in FIG. 14, allowing a greater volume for the water to fill. As the pressure in the system stabilizes, piston 414 moves back to its resting position, pushing fluid out of expanded fluid chamber 428 and back into the resting volume of fluid channel 428 and channels 426 and 434, and allowing any compressible material in pressurized chamber 420 to expand back to its resting state. Fluid channels 426, 428, and 434 cooperate to provide a continuous fluid channel through arrester apparatus 410.

Referring to FIGS. 13-16B, first end fitting 422 comprises a substantially cylindrical outer housing or body 412, an annular shoulder 441, a neck portion 421 extending outwardly (upstream) from annular shoulder 441, a barbed end 424 extending outwardly from neck 421, ribs 423 disposed around neck 421, and fluid channels 426 and 428. The exterior surface of body 412 preferably comprises ribs 415 in a circumferential and longitudinal direction. Ribs 415 are optional, but may add strength to the body 412, particularly if it is made of plastic materials. A lip 440 and stepped shoulder 457 are disposed at the downstream end of body 412 to facilitate joining first end fitting 422 to second end fitting 430 at joint 463. Barbed end 424 is disposed at the upstream end of neck 421. Ribs 423 are preferably included around neck 421 to further help secure barbed end 424 and neck 421 inside a flexible hose. Alternatively, threads may be provided around neck 421 to optionally threadably engage corresponding threads on another fitting attached to the flexible hose to secure first end fitting 422 to the hose. A longitudinal fluid channel 426 extends through barbed end 424 and neck 421. Another fluid channel 428 is formed on the interior of housing 412. Fluid may freely flow from fluid channel 426 to fluid channel 428 when fluid is flowing through the system. First end fitting 422 is preferably unitarily molded from plastic material, but other materials, including metals may be used. Most preferably, first end fitting 422 is molded from glass-filled acetal, POM (polyoxymethylene or acetal), or polyphenylsulfone.

Referring to FIGS. 13-14 and 17-18B, second end fitting 430 is disposed at the downstream end of arrester 410. Second end fitting 430 comprises annular shoulder 444, a neck portion 431 extending outwardly (downstream) from shoulder 444, a barbed end 432 extending outwardly from neck 431, ribs 433 disposed around neck 431, a substantially cylindrical fluid shaft 462, an a fluid channel 434 disposed inside shaft 462 and through neck 431 and barbed end 432. Annular shoulder 444 preferably has ribs 415 for added strength, but ribs 415 are optional. Ribs 433 are preferably included around neck 431 to further help secure barbed end 432 and neck 431 inside a flexible hose. Alternatively, threads may be provided around neck 431 to optionally threadably engage corresponding threads on another fitting attached to the flexible hose to secure second end fitting 430 to the hose. Fluid shaft 462 extends inwardly (upstream) from shoulder 444. An upstream end of fluid shaft 462 is substantially flush with the upstream end of piston 414 when piston 414 is in its resting position (as shown in FIG. 13). One or more ribs 413 prevent piston 414 from sliding off the upstream end of shaft 462. Alternatively, an upstream end of shaft 462 may extend partially into fluid chamber 428 with piston 414 being recessed from the upstream end of fluid shaft 462. Second end fitting 430 is preferably unitarily molded from plastic material, but other materials, including metals may be used. Most preferably, second end fitting 430 is molded from glass-filled acetal, POM (polyoxymethylene or acetal), or polyphenylsulfone.

Figure 16A:
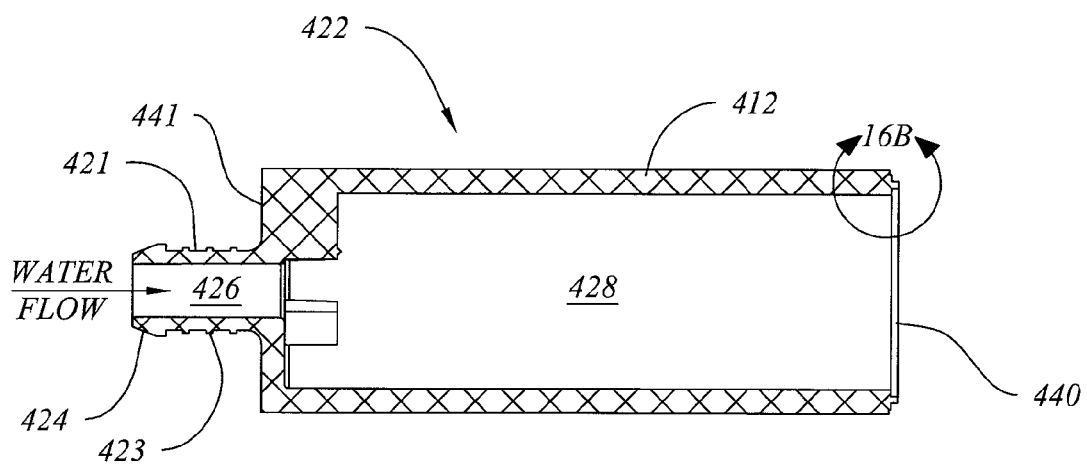
FIG. 16A is a cross-sectional side elevation view of the end fitting of FIG. 15.
Figure 16B:
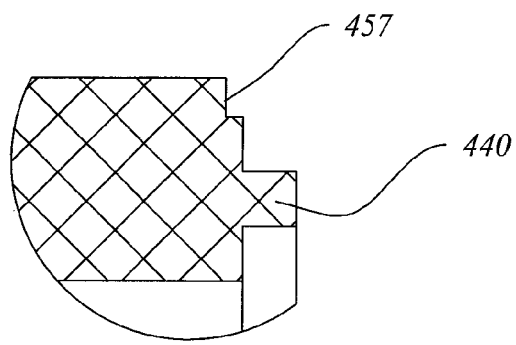
FIG. 16B is an enlarged view of a portion of the end fitting of FIG. 16A.
Figure 17:
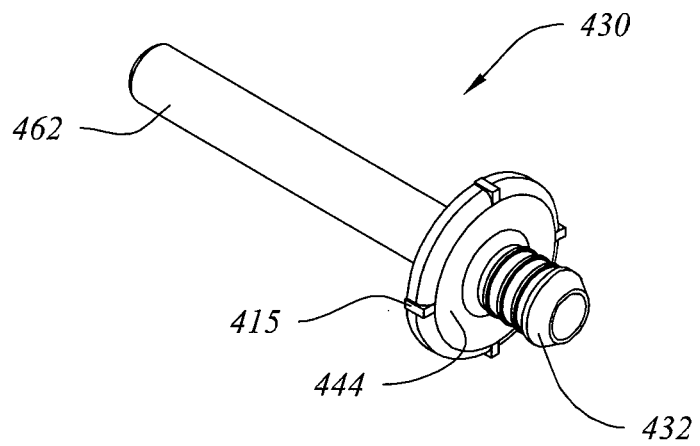
FIG. 17 is a perspective view of one embodiment of another end fitting according the invention.
Figure 18A:
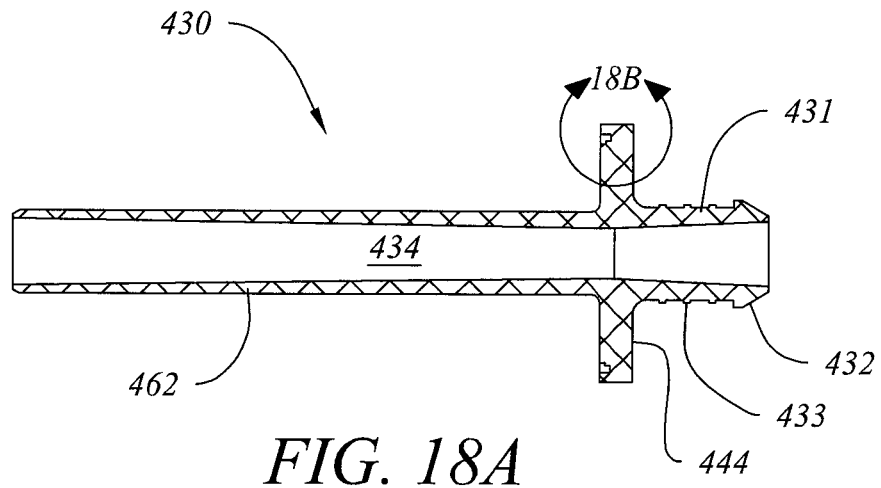
FIG. 18A is a side elevation view of the end fitting of FIG. 17.
Figure 18B:
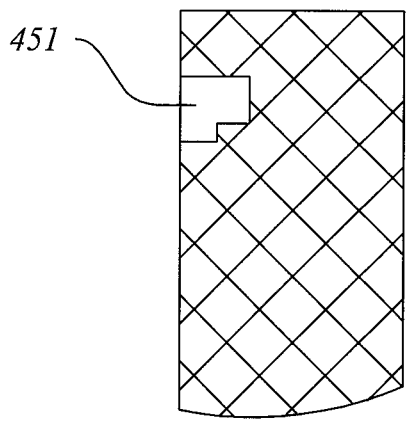
FIG. 18B is an enlarged view of a portion of the end fitting of FIG. 18A.

Referring to FIGS. 13, 16B and 18B, the downstream end of body 412 comprises a protruding lip 440 and a stepped shoulder 457 that engage with recess 451 on annular shoulder 444 of second end fitting 430 to form joint 463. End fitting 422 is preferably secured to end fitting 430 at joint 463 by ultrasonic welding of these parts. Other configurations for joining the end fittings may be used, such as spin welding, adhesives, snap-fit configurations, or threadable engagement, as will be understood by those of ordinary skill in the art.

Figure 19:
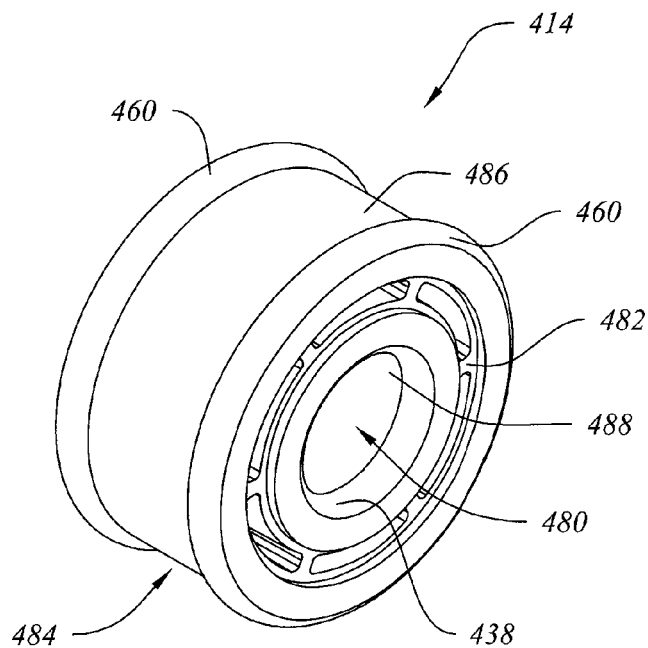
FIG. 19 is a perspective view of one embodiment of a piston according to the invention.
Figures 20, 21:
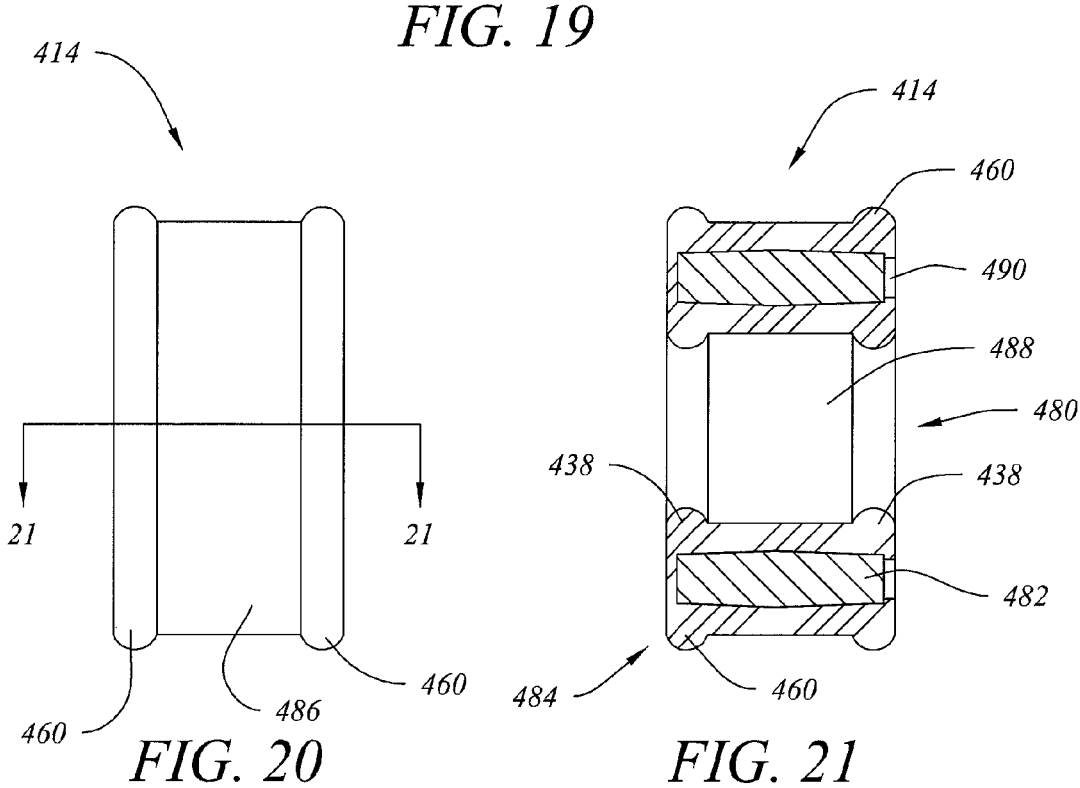
FIG. 20 is a side elevation view of the piston of FIG. 19.
FIG. 21 is a cross-sectional view of the piston of FIG. 20.

Referring to FIGS. 19-21, piston 414 is preferably substantially cylindrical. Piston 414 preferably comprises an inner ring 482 and an outer ring 484. Outer ring 484 preferably comprises exterior surface 486 and interior surface 488 forming annulus 480 through which shaft 462 is inserted. Annular lips 460 are formed at each end of exterior surface 486. Similarly annular lips 438 are formed at each end of interior surface 488. Inner ring 482 is preferably made from plastic materials, but other materials, including metals, may be used. Most preferably, inner ring 482 is made from ABS (acrylonitrile butadiene styrene). Outer ring 484 is preferably made from rubber or plastic materials, but other materials capable of sliding inside body 412 and along shaft 462 may be used. Most preferably, outer ring 484 is made from TPV material. Suitable materials for outer ring 484 include EPDM rubber (ethylene propylene diene monomer) or NBR rubber (acrylonitrile-butadiene). Preferably, a portion of outer ring 484 is molded, inner ring 482 is inserted and then additional material is molded to outer ring 484 to hold inner ring 482 in place, in an overmolding process that is well known to those of ordinary skill in the art. A two shot process along with an overmolding process or the use of adhesives to combine the two parts may also be used. Inner ring 482 may be fully encased within outer ring 484 or part of inner ring 482 may be left exposed through opening 490 in the overmolding process. As an alternative to lips 460 and 438, piston 414 may be made with recesses or protruding retaining members and sealing rings may be used, similar to piston 14.

Referring again to FIGS. 13-14, when arrester 410 is assembled, an annular recess 456 forms between an interior surface of body 412, exterior surface 486 of piston 414 and annular lips 460. A similar annular recess 458 is formed between an exterior surface of shaft 462, interior surface 488 of piston 414, and annular lips 438. Annular lips 460 and 438 frictionally engage housing 412 and shaft 462, respectively, to prevent fluid from fluid channel 428 or material inside pressurized chamber 420 (such as gas or water or gel) from leaking to or from fluid channel 428 and pressurized chamber 420. Annular recesses 456 and 458 reduce friction to allow piston 414 to slide more easily inside housing 412 and along shaft 462; however, other configurations for piston 414 may be used, including recesses with separate sealing rings as with piston 14.

Apparatus 410 is assembled by placing piston 414 over shaft 462, inserting shaft 462 inside body 412, hermetically sealing and pressurizing chamber 420 (preferably to 35-45 psi), and welding or otherwise sealing end fittings 422 and 430 together.

Referring to FIGS. 22-23, another preferred embodiment of an in-line water arrester apparatus 510 is depicted. Apparatus 510 preferably comprises a first end fitting 522, a second end fitting 530, interior housing or body 512, and a piston 514. Piston 514 is again shown in its resting position in FIG. 23. When a pressure spike occurs, piston 514 moves from this position sliding along the interior of housing 512 toward the downstream end of arrester 510 to transfer the shock of the pressure spike to the material within pressurized chamber 520.

First end fitting 522 is disposed at the upstream end of arrester 510 and preferably comprises a substantially cylindrical body 533, annular shoulder 541, neck 521, and barbed end 524. Fluid channel 526 is disposed within neck 521 and barbed end 524 of first end fitting 522. Another fluid channel 528 is disposed within body 533. In this embodiment, neck 521 partially extends into the interior of body 533 to abut an upstream end 568 of interior housing 512 to prevent rearward movement of interior housing 512, with the upstream end 568 of housing 512 and the extending part of neck 512 being configured to have an opening to allow fluid to flow from fluid channel 526 and into channel 528 and reservoir 570.

Second end fitting 530 is disposed at the downstream end of arrester 510 and preferably comprises substantially cylindrical body 562, annular shoulder 552, neck portion 531, and barbed end 532. One or more ribs 563 are disposed on the interior surface of body 562 near neck 531. Ribs 563 abut end 564 of interior housing 512 to prevent forward movement of housing 512 while still allowing fluid to flow from channel 582 (disposed within body 562) to channel 534 (disposed within neck 531). Fluid channels 526, 528, 582, and 534 cooperate to provide a continuous fluid channel through arrester apparatus 510. Fluid may freely flow between these channels. When arrester 510 is assembled, interior housing 512 is disposed partially within body 533 and partially within body 562. The upstream end of body 562 is disposed within cylindrical body 533. Alternatively, body 562 may be disposed around the exterior of cylindrical body 533. End fittings 522 and 530 are preferably joined together where body 562 and body 533 overlap using any type of connection suitable for the materials from which the fittings are manufactured. End fitting 522 and end fitting 530 are each preferably unitarily molded from plastics or metals.

Disposed between and on the interiors of end fittings 522 and 530 is interior housing 512. Interior housing 512 preferably comprises a substantially cylindrical body with an upstream end 568 and a sealed downstream end 564. Aperture 566 is disposed through upstream end 568 to allow fluid flowing through fluid channel 526 to contact piston 514. Arms 535 extend rearwardly from upstream end 568 and are configured to be inserted inside the portion of neck 521 that extends into body 533 to hold housing 512 in place within end fitting 522. Alternatively, arms 535 could fit around the outside of the extending portion of neck 521. Housing 512 is preferably a separate component of arrester 510, but may be integrally formed with or otherwise connected to either end fitting 522 or 530 to hold housing 512 in position inside arrester 510 and allow fluid to freely flow from channel 526 to 528 (and on through other fluid channels in arrester 510 as discussed below).

Piston 514 is disposed inside interior housing 512. Piston 514 preferably comprises a substantially u-shaped body 572 and retaining members 574 protruding outwardly from body 572. At least one annular recess 556 is formed by retaining members 574. Preferably there are at least three retaining members 574 that form two recesses 556. Disposed within each annular recess 556 is a sealing ring 560, which provides slidable engagement between piston 514 and an interior wall of housing 512. Sealing rings 560 prevent fluid/water in the system and material inside pressurized chamber 520 (such as a gas or water or gel) from leaking to or from fluid chambers 526, 528, 582, or 534 and pressurized chamber 520. Alternate configurations, such as recesses with sealing rings or protruding lips, similar to pistons 14 and 414, may also be used with piston 514. The upstream end of body 572 abuts an interior surface of end 568 of interior housing 512 so that the open end of body 572 is substantially aligned with aperture 566. A fluid reservoir 570 is disposed within an interior portion of body 572. Piston 514 is preferably unitarily molded from plastics or metals.

Pressurized chamber 520 is formed between an interior side wall of housing 512, downstream end 564, a downstream surface of piston body 572, and a downstream surface of a retaining member 574. Rearward movement of piston 514 is stopped by contact between an upstream end of piston body 572 and end 568 of housing 512. During normal fluid flow through the system, fluid fills reservoir 570 but the pressure is not great enough to cause piston 514 to move forwardly within interior housing 512. When a pressure spike occurs, the force of the fluid in the system against the interior of body 574 causes piston 514 to slide forwardly within interior housing 512, toward downstream end 564. When piston 514 moves forwardly, fluid in the system is allowed to partially fill an interior reservoir within housing 512 on the upstream side of reservoir 570. For a severe spike, piston 514 may move forwardly until downstream end of piston 514 nearly abuts end 564. When the pressure normalizes, fluid is pushed out of the expanded reservoir inside housing 512 and back into fluid channel 528 (and on out of arrester 510 through channels 582 and 534) as piston 514 returns to its resting position.

Arrester 512 is preferably assembled by inserting piston 514 inside housing 512, inserting housing 512 inside one of the end fittings, inserting end fitting 530 inside end fitting 522, hermetically sealing and pressurizing chamber 520, and sealing the end fittings where body 533 and body 562 overlap, using any connection suitable for the materials.

Referring to FIGS. 24-25, another preferred embodiment of an in-line water arrester apparatus 610 is depicted. Apparatus 610 preferably comprises a first end fitting 622, a second end fitting 630, and a piston 614. Piston 614 is again shown in its resting position in FIG. 25. When a pressure spike occurs, piston 614 moves from this position sliding along the interior of body 612 and the interior of shaft 662 toward the downstream end of arrester 610 to transfer the shock of the pressure spike to the material in pressurized chamber 620.

First end fitting 622 is disposed at the upstream end of arrester 610 and preferably comprises a substantially cylindrical body 633, annular shoulder 641, neck 621, and barbed end 624. Fluid channel 626 is disposed within neck 621 and barbed end 624 of first end fitting 622. Second end fitting 630 preferably substantially forms the outer housing or body of arrester 610, comprising substantially cylindrical body 612 and substantially cylindrical shaft 662. Second end fitting 630 also preferably comprises annular shoulder 688, annular shoulder 690, annular shoulder 644, neck portion 631, and barbed end 632. Fluid channel 682 is disposed within shaft 662 and fluid channel 634 is disposed within neck 631. Fluid may freely flow between channels 682 and 634.

Piston 614 preferably comprises a substantially cylindrical body 672, annular shoulder 643, and a substantially cylindrical shaft 674. Body 672 is open on the upstream end and abuts shoulder 643 on the downstream end. Fluid channel 670 is disposed within shaft 674 and through shoulder 643. Cylindrical body 672 and annular shoulder 643 form a substantially u-shaped configuration, with fluid channel 628 disposed within an interior of the u-shaped configuration. Fluid channels 626, 628, 670, 682, and 634 cooperate to provide a continuous fluid channel through arrester apparatus 610. At least one annular recess 656 is disposed within an exterior surface of a sidewall of body 672 that is adjacent an interior wall of body 612. Disposed within each annular recess 656 is a sealing ring 660, which provides slidable engagement between piston 614 and an interior wall of body 612. A downstream end shaft 674 is disposed within shaft 662. Another sealing ring 638 is disposed within recess 658 near shoulder 690. Sealing ring 638 remains stationary, but allows shaft 674 to slide relative to shaft 662. Alternatively, shaft 674 could have a sealing ring disposed around its exterior that slides within shaft 662 and with shaft 674. Sealing rings 660 and 638 prevent water and material inside pressurized chamber 620 (such as gas or water or gel) from leaking to or from fluid chambers 626, 628, or 682 and pressurized chamber 620.

Pressurized chamber 620 is formed between an interior side wall of body 612, an upstream surface of shoulder 688, a downstream surface of shoulder 643, and an exterior wall of fluid shaft 674. Rearward movement of piston 614 is stopped by contact between an upstream end of piston body 672 and the downstream surface of shoulder 641. When piston 614 is in its resting position (as shown in FIG. 25), the downstream end shaft 674 is disposed within shaft 662. A pressure spike in the system causes piston 614 to move forward, toward shoulder 688, as needed to accommodate the pressure spike. For a severe spike, piston 614 may move forwardly until downstream end of shoulder 643 nearly abuts the upstream/interior surface of shoulder 688. As piston 614 moves forwardly in response to a pressure spike, shaft 674 slides within shaft 662. Fluid chamber 628 expands within the interior of body 612 when piston 614 is pushed forward from its resting position.

End fitting 622, end fitting 630, and piston 614 are each preferably unitarily molded from plastics or metals. The upstream end of body 612 is disposed within cylindrical body 633 and abuts the downstream/interior surface of shoulder 641. Alternatively, body 612 may be disposed around the exterior of cylindrical body 633. End fittings 622 and 630 are preferably joined together where body 612 and body 633 overlap using any type of connection suitable for the materials.

Arrester 610 is preferably assembled by inserting piston 614 inside end fitting 630, inserting end fitting 630 inside end fitting 622, hermetically sealing and pressurizing chamber 620, and sealing the end fittings where body 633 and body 612 overlap, using any connection suitable for the materials.

Figure 26:
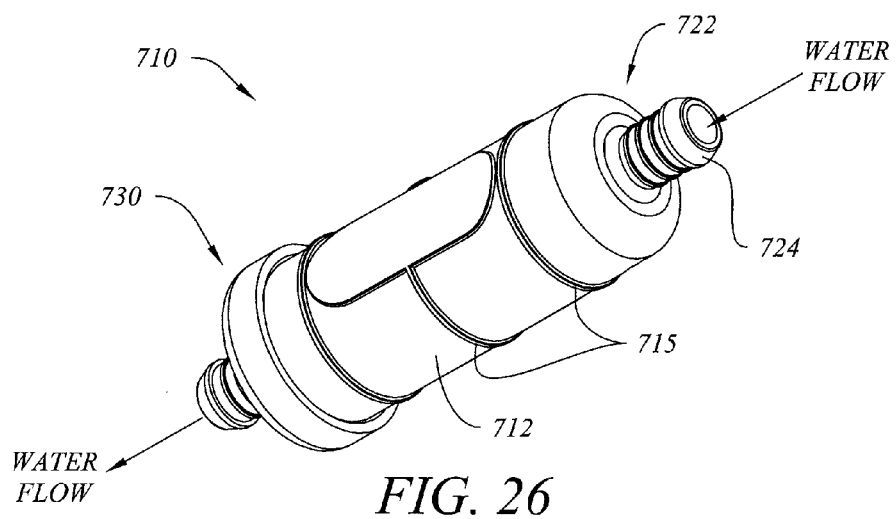
FIG. 26 is a perspective view of another embodiment of an apparatus according to the invention.
Figure 27A:
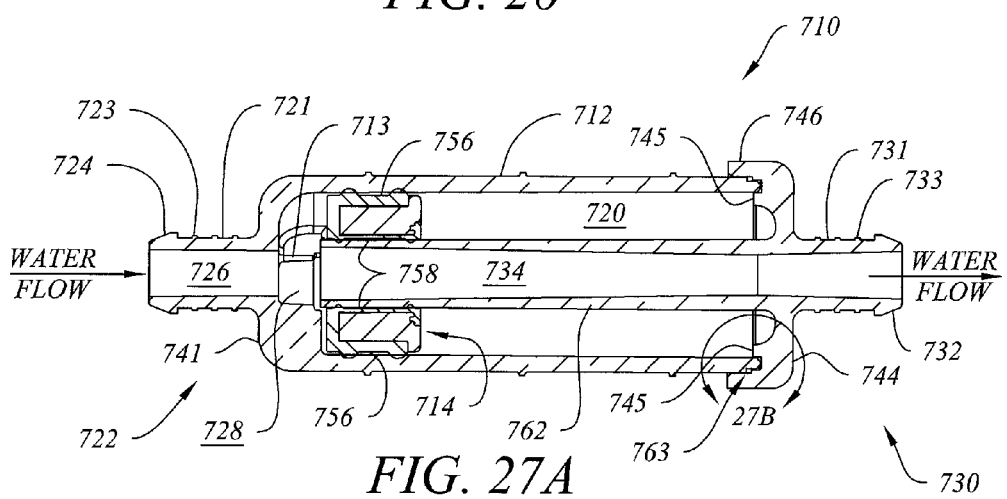
FIG. 27A is a cross-sectional side elevation view of the apparatus of FIG. 26.
Figure 27B:
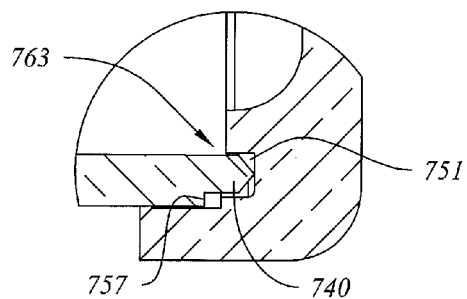
FIG. 27B is an enlarged view of a portion of FIG. 27A.
Figure 28:
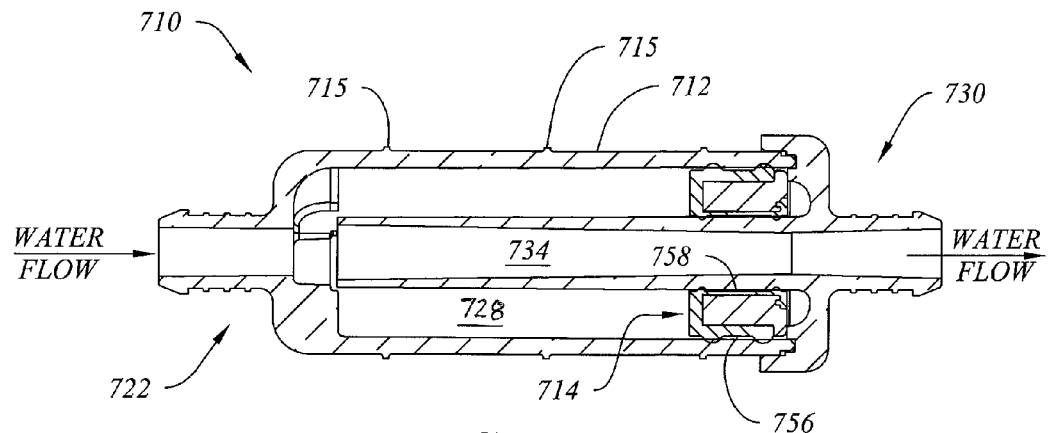
FIG. 28 is another cross-sectional side elevation of the apparatus of FIG. 26.
Figure 29:
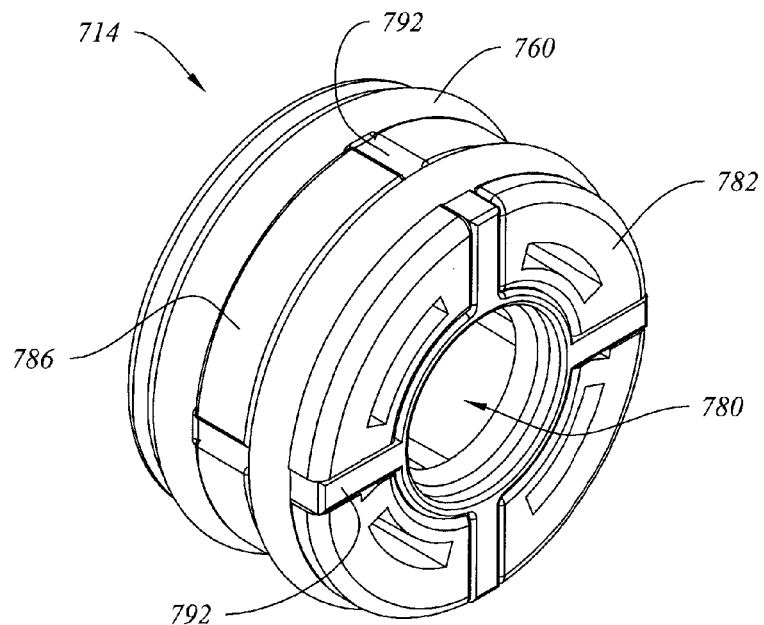
FIG. 29 is a perspective view of another embodiment of a piston according to the invention.
Figure 30:
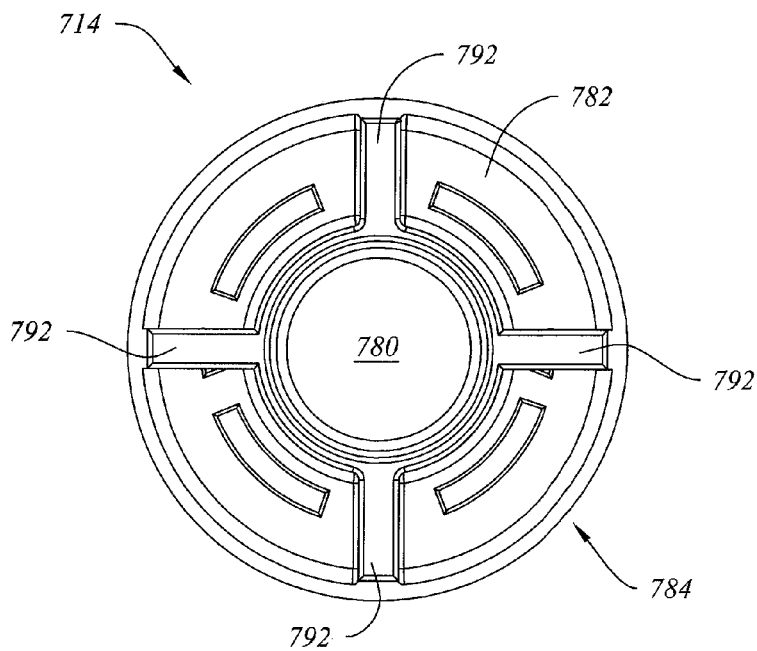
FIG. 30 is a front elevation view of the piston of FIG. 29.
Figures 31, 32:
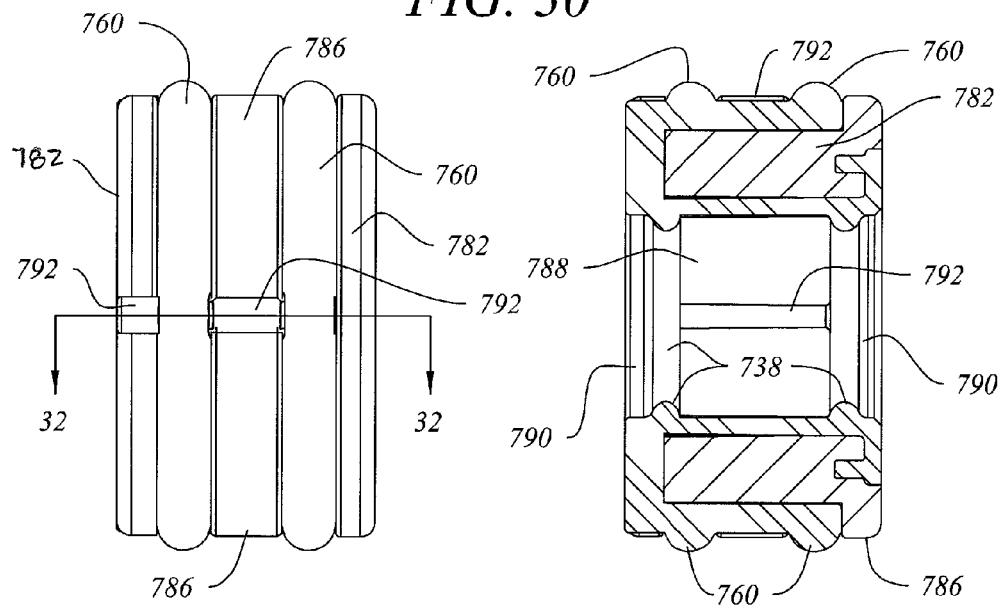
FIG. 31 is a side elevation view of the piston of FIG. 29.
FIG. 32 is a cross-sectional view of the piston of FIG. 30.

Referring to FIGS. 26-28, another preferred embodiment of an in-line water arrester apparatus 710 is depicted. Apparatus 710 preferably comprises a first end fitting 722, a second end fitting 730, and a piston 714. Pressurized chamber 720 is formed between an interior wall of body 712, an exterior wall of fluid shaft 762, a downstream end of piston 714, and annular shoulder 744. Piston 714 is shown in its resting position in FIG. 27A, when no pressure spike is occurring and the pressure in pressurized chamber 720 is greater than or substantially equal to the pressure in the system at fluid channels 726 or 728. Piston 714 is shown in FIG. 28 a substantially downstream position for when a pressure spike occurs and the pressure of the fluid in channel 728 is greater than the pressure in chamber 720. One or more ribs 713 prevent piston 714 from sliding off the end of shaft 762. Preferably there are three ribs 713 spaced in substantially equidistant positions around the interior of shoulder 741. When a pressure spike occurs, piston 714 slides along shaft 762 inside body 712 toward second end fitting 730, similar to piston 414 in FIG. 14. The position of piston 714 along shaft 762 between the resting and compressed positions will depend on the severity of the pressure spike and the compressibility of the material in the pressurized chamber 720. For a severe spike, piston 714 may move forwardly until its downstream end nearly abuts interior shoulder 745 (subject to the compressibility limits of the material inside pressurized chamber 720). Fluid chamber 728 is formed between shoulder 741, a sidewall of body 712, a sidewall of fluid shaft 762, and the upstream end of piston 714. When piston 714 is pushed forward from its resting position, fluid chamber 728 expands, similar to chamber 428 as shown in FIG. 14, allowing a greater volume for the water to fill. As the pressure in the system stabilizes, piston 714 moves back to its resting position, pushing fluid out of expanded fluid chamber 728 and back into the resting volume of fluid channel 728 and channels 726 and 734, and allowing any compressible material in pressurized chamber 720 to expand back to its resting state. Fluid channels 726, 728, and 734 cooperate to provide a continuous fluid channel through arrester apparatus 710.

First end fitting 722 preferably comprises a substantially cylindrical outer housing or body 712, an annular shoulder 741, a neck portion 721 extending outwardly (upstream) from annular shoulder 741, a barbed end 724 extending outwardly from neck 721, ribs 723 disposed around neck 721, and fluid channels 726 and 728. Annular shoulder 741 is preferably more rounded than shoulder 441 in apparatus 410. The exterior surface of body 712 preferably comprises circumferential ribs 715 spaced out along the length of body 712, but additional ribs in a longitudinal direction (similar to FIG. 12) may also be used in addition to or instead of the circumferential ribs 715. Ribs 715 are optional, but may add strength to the body 712, particularly if it is made of plastic materials. A lip 740 and stepped shoulder 757 are disposed at the downstream end of body 712 to facilitate joining first end fitting 722 to second end fitting 730 at joint 763. Barbed end 724 is disposed at the upstream end of neck 721. Ribs 723 are preferably included around neck 721 to further help secure barbed end 724 and neck 721 inside a flexible hose. Alternatively, threads may be provided around neck 721 to optionally threadably engage corresponding threads on another fitting attached to the flexible hose to secure first end fitting 722 to the hose. A longitudinal fluid channel 726 extends through barbed end 724 and neck 721. Another fluid channel 728 is formed on the interior of housing 712. Fluid may freely flow from fluid channel 726 to fluid channel 728 when fluid is flowing through the system. First end fitting 722 is preferably unitarily molded from plastic material, but other materials, including metals may be used. Most preferably, first end fitting 722 is molded from glass-filled acetal, POM (polyoxymethylene or acetal), or polyphenylsulfone.

Second end fitting 730 is disposed at the downstream end of arrester 710. Second end fitting 730 comprises annular shoulder 744 extending to a cylindrical body 746, interior shoulder 745, a neck portion 731 extending outwardly (downstream) from shoulder 744, a barbed end 732 extending outwardly from neck 731, ribs 733 disposed around neck 731, a substantially cylindrical fluid shaft 762, an a fluid channel 734 disposed inside shaft 762 and through neck 731 and barbed end 732. Ribs 733 are preferably included around neck 731 to further help secure barbed end 732 and neck 731 inside a flexible hose. Alternatively, threads may be provided around neck 731 to optionally threadably engage corresponding threads on another fitting attached to the flexible hose to secure second end fitting 730 to the hose. Fluid shaft 762 extends inwardly (upstream) from shoulder 744. An upstream end of fluid shaft 762 is substantially flush with the upstream end of piston 714 when piston 714 is in its resting position (as shown in FIG. 28). Second end fitting 730 is preferably unitarily molded from plastic material, but other materials, including metals may be used. Most preferably, second end fitting 730 is molded from glass-filled acetal, POM (polyoxymethylene or acetal), or polyphenylsulfone.

Referring to FIG. 27B, the downstream end of body 712 comprises a protruding lip 740 and a stepped shoulder 757 that engage with recess 751 formed between annular shoulder 744, interior shoulder 745, and body 746 of second end fitting 730 to form joint 763. End fitting 722 is preferably secured to end fitting 730 at joint 763 by ultrasonic welding of these parts. Body 746 overlaps a portion of body 712 to provide added strength and stability to arrester 710 near joint 763. Alternatively, body 746 may longitudinally extend down the length of apparatus 710 and body 712 may be shortened, locating joint 763 at the upstream end of apparatus 710, reversing the configuration of the outer housing shown in FIGS. 27A-28, as will be understood by those of ordinary skill in the art. Other configurations for joining the end fittings may be used, such as spin welding, adhesives, snap-fit configurations, or threadable engagement, as will be understood by those of ordinary skill in the art.

Referring to FIGS. 29-32, piston 714 is preferably substantially cylindrical. Piston 714 preferably comprises an inner body or ring 782 and an sealing portion 784. Inner ring 782 has an interior surface 788 forming annulus 780 through which shaft 762 is inserted and an outer surface 786. Sealing portion 784 preferably comprises rings 790, inner annular lips 738, outer annular lips 760, and a plurality of bands 792. A ring 790 is disposed over a portion of surface 788 near an upstream end of piston 714 and another ring 790 is similar disposed near the downstream end of piston 714. An annular lip 738 extends inwardly into annulus 780 from each ring 790. Two outer annular lips 760 extend outwardly from outer surface 786, one near the upstream end and the other near the downstream end of piston 714. Lips 738 and 760 cooperate to provide a seal against shaft 762 and an interior of body 712, allowing piston 714 to slide along shaft 762 inside body 712 without fluid leakage to or from fluid chamber 728 or pressurized chamber 720. A plurality of bands 792 connect rings 790 with each other and with outer annular lips 760 to form sealing portion 784.

Most preferably, inner ring 782 is made from plastic material (such as ABS, but other materials, including metal may also be used) that provides rigidity to piston 714 and is over-molded with rubber (such as EPDM or NBR rubber) to form sealing portion 784 to provide a seal within arrester 710, but other mechanisms may be used to attach sealing portion 782 to inner ring 782. The use of bands 792 over outer surface 786 to connect annular lips 760 and leaving a portion of outer surface 786 exposed adds rigidity and support to the sealing portion 784, reducing the possibility of leakage.

Referring again to FIGS. 26-28, when arrester 710 is assembled, an annular recess 756 forms between an interior surface of body 712, exterior surface 786 of piston 714 and annular lips 760. A similar annular recess 758 is formed between an exterior surface of shaft 762, interior surface 788 of piston 714, and annular lips 738. Annular lips 760 and 738 frictionally engage housing 712 and shaft 762, respectively, to prevent fluid from fluid channel 728 or material inside pressurized chamber 720 (such as gas or water or gel) from leaking to or from fluid channel 728 and pressurized chamber 720. Annular recesses 756 and 758 reduce friction to allow piston 714 to slide more easily inside housing 712 and along shaft 762; however, other configurations for piston 414 may be used, including recesses with separate sealing rings as with piston 14.

Apparatus 710 is assembled by placing piston 714 inside housing or body 712 and then inserting shaft 762 inside body 712 and piston 714, hermetically sealing and pressurizing chamber 720 (preferably to 40-50 psi), and then welding or otherwise sealing end fittings 722 and 730 together, such as by sonic welding of joint 763. Piston 714 is preferably lubricated prior to assembly to allow it to move more freely along shaft 762 and inside body 712. Alternative, a piston similar to piston 14, with separate o-rings, may also be used with apparatus 710.

Pressure spikes in fluid or piping systems (including a system using hard piping, flexible hoses or tubing, or combination) occur upstream of a closing valve. Arresters according to the invention are installed upstream from a valve in a fluid or piping system that would close and create a pressure spike. Typically, such a valve is part of the appliance with which the arrester is being used. For use with a washing machine, for example, arresters according to the invention would be installed in the flexible water supply line between the water supply valve installed in the outlet box at the wall (which is usually left in the on position and is not the source of the pressure spike) and the washing machine. Alternatively, arresters according to the invention could be installed inside the appliance, most preferably by the manufacturer of the appliance, near the appliance valve that may cause the pressure spike. During normal operation of a fluid or piping system in which an arrester according to the invention has been installed, fluid (typically water) flows from first end fitting (e.g. 22 at the upstream or rearward end of arrester 10) toward the second end fitting. (e.g. 30 at the downstream or front end of arrester 10).

Once assembled, the pressurized chambers of the various embodiments of the arrester apparatuses according to the invention have an internal pressure that is not adjustable by external means, such as a valve or other port to add or release compressible material (e.g. air) from within the chamber. When no pressure spike is occurring, the internal pressure inside the pressurized chamber (e.g. chamber 20) is greater than or substantially equal to the pressure of the fluid in the fluid channel (e.g. channel 28) and the piston (e.g. piston 14) is held in a substantially upstream (resting) position within the outer housing or body of the apparatus. When a pressure spike occurs because of a closing valve downstream of the arrester apparatus, the pressure of the fluid in the fluid channel (e.g. channel 28) is greater than the internal pressure in the pressurized chamber, which causes the piston (e.g. piston 14) to move in a downstream direction, expanding the volume of the fluid channel (e.g. channel 29) and temporarily reducing the volume of the pressurized chamber. Once the pressure spike dissipates, the piston is allowed to return to its resting state. Once the arrester apparatus is assembled, the internal pressure within the pressurized chamber is only variable based on the position of the piston within the device.

Arresters according to the invention preferably have a connector disposed at each end for connecting the arrester to a pipe, hose, valve, or semi-rigid PEX riser. The end fittings described herein are one preferred type of connector, particularly useful for a homeowner connecting an arrester to a flexible water supply line. A length of pipe or hose attached to each end of an arrester according to the invention, or a valve attached to one end and another connector attached at the other end, may also be used as types of connectors. Different types of connectors may be used at each end of an arrester, depending on the use and type of installation for the arrester. Each end fitting described herein preferably has a barbed end (e.g. barbed ends 24 and 32) to facilitate insertion into a flexible hose. These barbed ends are preferably widest near the neck portion (e.g. neck 21) and taper as they extends outwardly from the neck, with the widest, barbed portion helping to secure the barbed end within the hose and prevent the arrester from dislodging from the flexible hose. A barbed end is not required, but is preferred, particularly when arresters according to the invention are installed in flexible hoses. Other types of connectors, such as threaded connectors or a clamp or crimp-type connector, or any other type of connector suitable for connection of the arrester to a pipe, hose, valve, or PEX riser (as will be understood by those of ordinary skill in the art) may also be used. Such connectors would mate with similar connectors installed on a flexible hose or tubing, piping, valve, or PEX riser with which an arrester according to the invention is to be used. Additionally, ribs or threads may optionally be provided around any neck portion of the arresters 10, 110, 210, 310, 510 or 610, similar to ribs 423 and 433 in arrester 410, to aid in connection of the arrester to a hose or pipe. When used with hard piping, a threaded engagement between the end fittings and the piping is preferred. Alternatively, the end fittings or other connectors could be soldered, cemented, clamped, or otherwise secured to the piping or hose using any type of connection suitable for the materials used to manufacture the parts.

Arresters according to the invention may be connected at the site of installation to, or pre-assembled with connections to, PVC or reinforced PVC hose liners, EPDM and other single layer thermoplastic liners, polyethylene (LDPE, LLDPE, and HDPE) hose liners, including corrugated hose liners made from these materials, UltraCore and other coextruded hose liners, three layer and other multilayer extruded hose liners, silicone hose liners, flexible PEX hose liners, semi-rigid PEX risers, copper pipe, stainless steel pipe, or other metal piping. Arresters according to the invention are useful with numerous commercial and household appliances and fixtures, such as icemakers, washing machines, dishwashers, kitchen sinks, lavatory sinks, laundry sinks, toilets, and mini-bar sinks. Arresters according to the invention may also be useful in industrial applications. When preassembled or pre-packaged already connected to a segment of hose or piping, barbed ends and neck portions on the end fittings may not be necessary and the hose or pipe may be attached to or integrally formed with part of the housing, body or end fittings of the arrester. Overmolded fittings, crimping, soldering, clamping, threaded engagement, ultrasonic welding, and other known methods may be used to integrate a hose or piping segment to the arresters according to the invention when the arrester is pre-assembled with such a connection. Those of ordinary skill in the art will understand the modifications that would be needed for such alternate connection configurations. The ends of such segment of hose or piping may come with threaded connectors that are easily attached at one end to a threaded connection at the water supply valve and attached at the other end to a threaded connection at the inlet of an appliance, such as a clothes washer, dishwasher, or ice maker.

The pressurized chambers (e.g. 20 and 120) in arresters according to the invention preferably meet the latest edition of ASSE 1010 testing standards to adequately reduce the impact of a pressure spike in the system. Although air is the preferred gas to use in the pressurized chambers, other gases, preferably inert gases such as nitrogen, may also be used. Other materials, such as water, gel, or mechanical structures (such as springs), capable of absorbing the shock caused by the spike may also be used with the pressurized chambers. A piston similar to piston 14, 414, or 714 may be used with any arrester embodiment according to the invention. Other alterations and configurations of pistons may also be used, including piston 514. These pistons are configured to move within the apparatus in response to a pressure spike between a resting position and a forward position. The movement of the piston between the resting position and the forward position is substantially in-line with the direction of fluid flow through the fluid or piping system at a point of upstream connection between the fluid or piping system and the apparatus. The movement from the forward position back to the resting position is in the reverse direction, but is still substantially along the same axis as the direction of fluid flow through the fluid or piping system at a point of upstream connection between the fluid or piping system and the apparatus.

The materials described herein for manufacturing the various parts of the preferred embodiments of arresters according to the invention, including copper, copper allow, brass, metal sheet, stainless steel, and plastics, are not intended to be limiting. Any materials suitable to withstand the pressure in the system and in pressurized chamber, and suitable for use with the particular type of fluid flowing through the system, may be used. With integrated parts, such as in arrester 410, arresters according to the invention may be made with as few as three separate components.

References to front (or forward) and rear (or back) herein generally refer to the direction of fluid flow through the piping system in which an arrester according to the invention is installed, with forward being in the downstream direction. Those of ordinary skill in the art will also appreciate upon reading this specification and the description of preferred embodiments herein that modifications and alterations to the apparatus may be made within the scope of the invention and it is intended that the scope of the invention disclosed herein be limited only by the broadest interpretation of the appended claims to which the inventors are legally entitled.

We claim:

1. A pressure spike reducing apparatus comprising:
   an outer housing comprising a first part and a second part, each part comprising an annular shoulder and a substantially cylindrical body extending from a radially exterior portion of the shoulder;
   a fluid channel at least partially disposed inside the outer housing, the fluid channel permitting the flow of fluid through the apparatus from an upstream end and out a downstream end;
   a substantially cylindrical piston disposed within the outer housing and configured to move within the outer housing between a substantially upstream position and a substantially downstream position in response to a pressure spike;
   a pressurized chamber within the outer housing and downstream of the piston, the pressurized chamber having an internal pressure that is only adjustable by movement of the piston;
   wherein the annular shoulder of the first part is disposed at an upstream end of the apparatus and the annular shoulder of the second part is disposed at a downstream end; and
   wherein the substantially cylindrical body of either the first part or the second part at least partially overlaps an end of the substantially cylindrical body of the other part;
   wherein the second part further comprises a shaft extending in an upstream direction relative to the shoulder, the shaft forming part of the fluid channel;
   wherein the piston is disposed around the shaft;
   wherein the piston comprises an inner body and a sealing body that is at least partially overmolded on the inner body and wherein the inner body is made of a material that is more rigid than the sealing body.

2. The pressure spike reducing apparatus of claim 1 wherein the end of the cylindrical body that is overlapped by the other cylindrical body comprises a protruding lip configured to engage with a recessed area on the annular shoulder of the other part.

3. The pressure spike reducing apparatus of claim 2 wherein the first part and the second part are sealed together by a sonic weld.

4. The apparatus according to claim 1 wherein the longitudinal axis of the apparatus is substantially in-line with the direction of fluid flow through a pipe, flexible hose, valve or semi-rigid PEX riser to which the apparatus is configured to be connected.

5. The apparatus according to claim 1 wherein the sealing body comprises a plurality of bands that leave portions of the inner body exposed.

6. The apparatus according to claim 5 wherein at least one of the exposed portions of the inner body is adjacent an interior wall of the cylindrical body of the first part.

7. The apparatus according to claim 5 wherein at least one of the exposed portions of the inner body is adjacent an exterior wall of the shaft.

8. The apparatus of claim 1 further comprising a material disposed within the pressurized chamber capable of absorbing a shock created by a pressure spike.

9. The apparatus of claim 8 wherein the material is selected from the group consisting of water, pressurized gas, gel, foam, a mechanical spring and combinations thereof.

10. The apparatus according to claim 1 further comprising a first connector extending in an upstream direction from the annular shoulder of the first part and a second connector extending in a downstream direction from the annular shoulder of the second part;

wherein the first and second connectors are configured to selectively connect the apparatus to a pipe, flexible hose, valve or semi-rigid PEX riser to permit the flow of fluid from the first connector through the fluid channel and out the second connector.

11. The apparatus according to claim 10 wherein at least one connector comprises threads configured to engage with corresponding threads on the pipe, flexible hose, valve or semi-rigid PEX riser to which the apparatus is to be connected.

12. The apparatus according to claim 10 wherein at least one connector comprises a neck extending outwardly from the outer housing and a barbed end extending outwardly from the neck.

\* \* \* \* \*